United States Patent
Yokoyama et al.

(10) Patent No.: US 11,722,012 B2
(45) Date of Patent: Aug. 8, 2023

(54) POWER FEED SYSTEM AND POWER FEED METHOD

(71) Applicant: TOYOTA JIDOSHA KABUSHIKI KAISHA, Aichi-ken (JP)

(72) Inventors: Daiki Yokoyama, Gotemba (JP);
Toshiya Hashimoto, Miyoshi (JP);
Katsuya Kobayashi, Okazaki (JP);
Takahiro Hirano, Gotemba (JP);
Midori Sugiyama, Susono (JP);
Ryunosuke Yamashita, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/856,919

(22) Filed: Jul. 1, 2022

(65) Prior Publication Data
US 2023/0006480 A1 Jan. 5, 2023

(30) Foreign Application Priority Data
Jul. 2, 2021 (JP) .................. 2021-110824

(51) Int. Cl.
*H02J 50/40* (2016.01)
*H02J 50/80* (2016.01)
*H02J 50/90* (2016.01)
*H02J 50/10* (2016.01)

(52) U.S. Cl.
CPC ............ *H02J 50/402* (2020.01); *H02J 50/10* (2016.02); *H02J 50/80* (2016.02); *H02J 50/90* (2016.02)

(58) Field of Classification Search
CPC ....................................... H02J 50/10
See application file for complete search history.

(56) References Cited

U.S. PATENT DOCUMENTS

2007/0279002 A1* 12/2007 Partovi .................. H02J 50/12
320/115
2021/0135468 A1* 5/2021 Park ..................... H02J 50/402

FOREIGN PATENT DOCUMENTS

JP 2018157686 A 10/2018

* cited by examiner

*Primary Examiner* — Daniel Kessie
(74) *Attorney, Agent, or Firm* — Hauptman Ham, LLP

(57) ABSTRACT

A power feed system includes a power feed mat and a computer. The power feed mat includes a plurality of power transmission coils. The power feed mat is configured to feed power to at least one movable body on the power feed mat by using at least one of the plurality of power transmission coils. The computer is configured to determine whether or not to permit power feed to a movable body that requests power feed. In the power feed system, when the computer determines not to permit power feed, the power feed mat does not feed power to the movable body that requests power feed.

16 Claims, 15 Drawing Sheets

FIG.14

| MOVABLE BODY | SOC | AMOUNT OF REQUESTED POWER FEED | TASK | | | PRIORITY | |
| --- | --- | --- | --- | --- | --- | --- | --- |
| | | | START | TYPE | PROFIT | INDEX | RANK |
| #1 | 60% | 10% | WITHIN 20 MINS. | STANDARD MAIL | 500 YEN | 75 | 4 |
| #2 | 40% | 20% | WITHIN 5 MINS. | COOL SERVICE | 2000 YEN | 340 | 2 |
| #3 | 40% | 30% | WITHIN 60 MINS. | EXPRESS MAIL | 1000 YEN | 181 | 3 |
| #4 | 50% | 20% | URGENT | | 0 YEN | ∞ | 1 (HIGHEST PRIORITY) |

POWER FEED SYSTEM AND POWER FEED METHOD

This nonprovisional application is based on Japanese Patent Application No. 2021-110824 filed with the Japan Patent Office on Jul. 2, 2021, the entire contents of which are hereby incorporated by reference.

BACKGROUND

Field

The present disclosure relates to a power feed system and a power feed method.

Description of the Background Art

For example, according to the disclosure in Japanese Patent Laying-Open No. 2018-157686, when a vehicle that travels on a power feed lane where a plurality of power feed units are provided along a lane senses presence of a foreign matter on a road in front of a vehicle body, the vehicle transmits a signal for stopping or suppressing power feed from power feed units present within a prescribed range in front and in the rear of a point where presence of the foreign matter is sensed.

SUMMARY

The power feed units described in Japanese Patent Laying-Open No. 2018-157686 are buried in the road. Each of the plurality of power feed units includes one power transmission coil. In contrast, the inventors of the present application propose a power feed mat including a plurality of power transmission coils. The plurality of power transmission coils included in one power feed mat are configured to individually feed power to different movable bodies. The movable body can select one power transmission coil from among the plurality of power transmission coils included in the power feed mat and receive power feed from the selected power transmission coil.

A plurality of power transmission coils may simultaneously feed power to a plurality of movable bodies on a power feed mat. A power capacity of the power feed mat, however, is limited. Therefore, when all power transmission coils included in the power feed mat simultaneously feed power, total power fed by the power feed mat (that is, a total value of electric power consumed in power feed in the power feed mat) may exceed the power capacity of the power feed mat.

The present disclosure was made to solve the problem, and an object thereof is to appropriately restrict use of power transmission coils in a power feed mat including a plurality of power transmission coils that feed power to a movable body.

A power feed system according to a first point of view of the present disclosure includes a power feed mat and a computer (which will also be referred to as a "power feed computer" below). The power feed mat includes a plurality of power transmission coils. The power feed mat is configured to feed power to at least one movable body on the power feed mat by using at least one of the plurality of power transmission coils. The power feed computer is configured to determine whether or not to permit power feed to a movable body that requests power feed. In this power feed system, when the power feed computer determines not to permit power feed, the power feed mat does not feed power to the movable body that requests power feed.

In the power feed system, the power feed computer determines whether or not to permit power feed to a movable body that requests power feed. Then, in the power feed system, when the power feed computer determines not to permit power feed, power is not fed to the movable body that requests power feed. Therefore, in the power feed system, the power feed computer can appropriately restrict use of the power transmission coils included in the power feed mat.

The power feed computer may be a stationary server or may be mounted on a mobile terminal. Examples of the movable body include an uninhabited movable body (an automated guided vehicle (AGV), a drone, and the like) and a vehicle (a car, a boat, and the like).

The power feed computer may determine whether or not the movable body that requests power feed falls under a subject movable body adapted to the power feed mat. When the movable body that requests power feed does not fall under the subject movable body, the power feed computer may determine not to permit power feed to the movable body that requests power feed. When the movable body that requests power feed falls under the subject movable body and the power feed mat is not feeding power, the power feed computer may determine to permit power feed to the movable body that requests power feed. When the movable body that requests power feed falls under the subject movable body and the power feed mat is feeding power to another movable body, the power feed computer may determine whether or not total feed power in the power feed mat exceeds a power capacity of the power feed mat if power is fed simultaneously to all of the movable body that requests power feed and another movable body. When the total feed power does not exceed the power capacity even if power is fed simultaneously to all of the movable body that requests power feed and another movable body, the power feed computer may determine to permit power feed to the movable body that requests power feed. When the total feed power exceeds the power capacity if power is fed simultaneously to all of the movable body that requests power feed and another movable body, the power feed computer may determine whether or not to permit power feed to the movable body that requests power feed based on a priority of each of the movable body that requests power feed and another movable body.

According to the configuration, when a movable body not adapted to the power feed mat requests power feed, power is not fed to the movable body that requests power feed. The subject movable body (the movable body adapted to the power feed mat) may be a movable body registered in the power feed computer. The power feed computer may determine whether or not the movable body that requests power feed falls under the subject movable body based on charging power (kW) requested by the movable body.

According to the configuration, total feed power in the power feed mat (that is, a total value of electric power consumed in power feed in the power feed mat) exceeding the power capacity thereof (that is, an upper limit value of total feed power at or below which the power feed mat can normally feed power) is suppressed. In the power feed system, when total feed power in the power feed mat exceeds the power capacity thereof if power is fed simultaneously to all of the movable body that requests power feed and another movable body, the power feed computer determines whether or not to permit power feed to the movable body that requests power feed based on the priority of each of the movable body that requests power feed and another movable body. In other words, when the movable body that requests power feed is higher in priority than another movable body, power feed to the movable body that requests power feed is permitted. According to the configuration, the movable body preferentially fed with power can be determined based on the priority of each movable body.

The power feed computer may be configured to determine the priority of each of the movable body that requests power feed and another movable body based on at least one of a remaining amount of stored power, a target amount of stored power, presence of a task, a type of the task, time to start the task, and a profit from the task. The power feed computer may determine whether or not a movable body for delivery has a task based on whether or not it is carrying a load.

The power feed computer may be configured to determine the priority such that a movable body smaller in remaining amount of stored power is higher in priority. According to such a configuration, restriction of power feed to the movable body small in remaining amount of stored power is less likely. Thus, the movable body running out of power is suppressed.

The remaining amount of stored power of the movable body can be expressed, for example, with a state of charge (SOC) of a power storage included in the movable body. The SOC is, for example, representation of a ratio within a range from 0 to 100%, of a current amount of stored power to an amount of stored power in a fully charged state.

The power feed computer may be configured to determine, when each of the movable body that requests power feed and another movable body is a movable body for delivery, the priority such that a movable body carrying a load is higher in priority than a movable body not carrying a load. According to such a configuration, restriction of power feed to a movable body carrying a load is less likely.

The power feed computer may be configured such that, when each of the movable body that requests power feed and another movable body has a task, the power feed computer evaluates the task for each movable body and determines the priority based on a result of evaluating the task. According to such a configuration, prioritized power feed to a movable body with a task that is evaluated as high in priority is facilitated. For example, by raising the priority of an emergency vehicle, prioritized power feed to the emergency vehicle is facilitated.

The power feed computer may be configured to communicate with each of the plurality of movable bodies. Each of the plurality of movable bodies may include a power storage, a power reception coil that receives electric power from a power transmission coil included in the power feed mat, a charging circuit that charges the power storage with electric power received by the power reception coil, and a first controller that controls the charging circuit. The power feed computer may be configured to transmit a first permission signal to the movable body that requests power feed when the power feed computer determines to permit power feed to the movable body that requests power feed. The first controller may be configured to carry out control for starting charging of the power storage when alignment between the power reception coil of the movable body that requests power feed and any power transmission coil included in the power feed mat is completed and the movable body receives the first permission signal.

According to the configuration, the power feed computer can restrict power feed to the movable body by not transmitting the first permission signal to the movable body (first controller).

Each of the plurality of movable bodies may be an autonomous vehicle configured to travel with electric power stored in the power storage, without human intervention. Each of the plurality of movable bodies may be configured such that, when a corresponding movable body of the plurality of movable bodies arrives at the power feed mat, the corresponding movable body selects one power transmission coil from among the plurality of power transmission coils and aligns the selected power transmission coil and the power reception coil with each other.

According to the configuration, the autonomous vehicle can move to the power feed mat and receive power feed from the power transmission coil included in the power feed mat.

Any power feed system described above may further include a power supply circuit and a power control circuit. The power supply circuit may be configured to supply electric power to each of the plurality of power transmission coils. The power control circuit may be configured to receive supply of electric power from the power supply circuit and to switch between connection and disconnection between each of the plurality of power transmission coils and the power supply circuit.

In the power feed system, the power supply circuit can supply electric power to each of the plurality of power transmission coils included in the power feed mat. The power control circuit can switch between supply and non-supply of electric power from the power supply circuit to each power transmission coil.

The power control circuit and the power feed computer may be provided in the power feed mat. The power control circuit may be configured to selectively supply electric power to a power transmission coil designated by the power feed computer among the plurality of power transmission coils.

According to the configuration, as the power feed computer sends a control signal (specifically, a signal designating a power transmission coil that feeds electric power) to the power control circuit in the power feed mat, a movable body power feed to which is permitted (and a power transmission coil corresponding to that movable body) and a movable body power feed to which is not permitted (and a power transmission coil corresponding to that movable body) can be determined or changed.

The power feed mat may include a second controller that controls the power control circuit. The power feed computer may be configured to communicate with the second controller. The power feed computer may be configured to transmit a second permission signal to the power feed mat when the power feed computer determines to permit power feed to the movable body that requests power feed. The second controller may be configured to carry out, when alignment between the movable body that requests power feed and any power transmission coil included in the power feed mat is completed and the power feed mat receives the second permission signal, control for starting power feed by a power transmission coil the alignment of which is completed.

According to the configuration, the power feed computer can prevent power feed to the movable body by not transmitting the second permission signal to the power feed mat (second controller).

The power feed mat may be flexible to such an extent that the power feed mat can be rolled into a cylinder. Since such a power feed mat can be rolled into a cylinder, it can easily be carried.

The power feed mat may be formed by combination of a plurality of plate members. The power feed mat may be constructed as being disassemblable into the plurality of plate members. Each of the plurality of plate members may include at least one power transmission coil.

Since the power feed mat is constructed as being disassemblable into a plurality of plate members, it can easily be carried.

The power feed mat may be constructed to be placed on a floor indoors. Such a power feed mat is suitable for charging of a small movable body (for example, an AGV or a robot) used indoors.

A power feed method according to a second point of view of the present disclosure includes first to third determination steps shown below.

In the first determination step, whether or not a movable body that requests a power feed mat to feed power falls under a subject movable body adapted to the power feed mat, the power feed mat being configured to wirelessly feed power, is determined. In the second determination step, when the movable body that requests power feed falls under the subject movable body and the power feed mat is feeding power to another movable body, whether or not total feed power in the power feed mat exceeds a power capacity of the power feed mat if power is fed simultaneously to all of the movable body that requests power feed and another movable body is determined. In the third determination step, when the total feed power exceeds the power capacity if power is fed simultaneously to all of the movable body that requests power feed and another movable body, whether or not to permit power feed to the movable body that requests power feed is determined based on a priority of each of the movable body that requests power feed and another movable body.

According to the power feed method as well, similarly to the previously described power feed system, use of the power transmission coils in the power feed mat can appropriately be restricted.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 14 is a diagram showing a method of determining a priority according to a modification.

DESCRIPTION OF THE PREFERRED EMBODIMENTS

Figure 1:
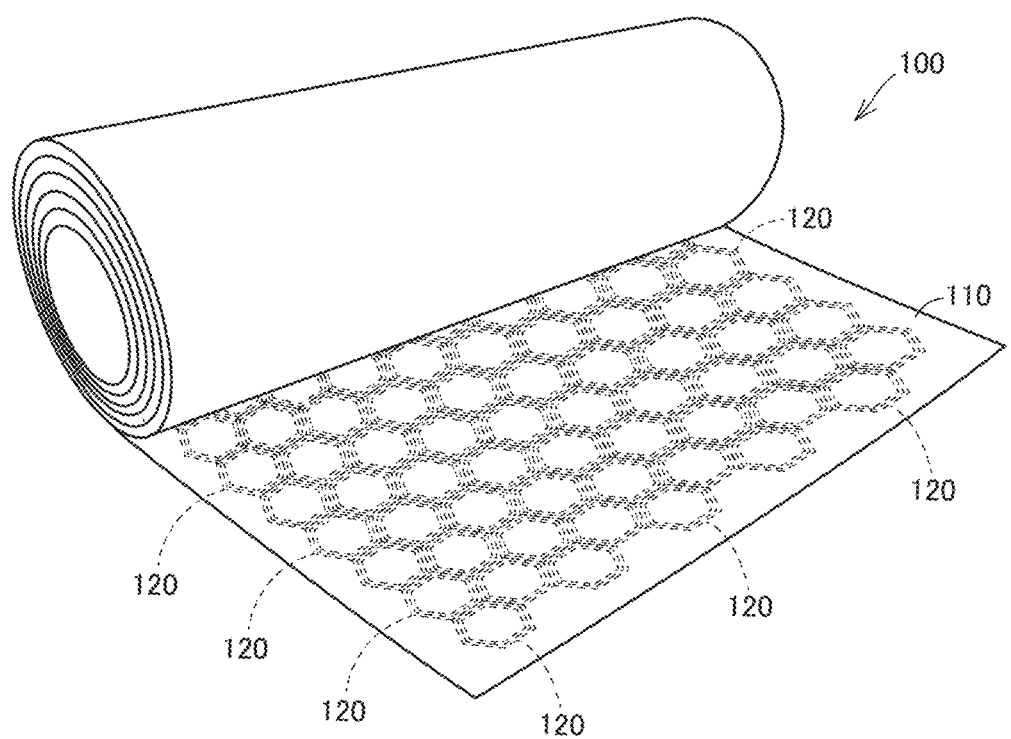
FIG. 1 is a diagram showing a power feed mat according to a first embodiment of the present disclosure.

An embodiment of the present disclosure will be described in detail below with reference to the drawings. The same or corresponding elements in the drawings have the same reference characters allotted and description thereof will not be repeated.

First Embodiment

FIG. 1 is a diagram showing a power feed mat according to this embodiment. Referring to FIG. 1, a power feed mat 100 includes a sheet substrate 110 and a plurality of power transmission coils 120 provided in the inside of sheet substrate 110. Power feed mat 100 is constructed as being portable. Power feed mat 100 has a light weight, for example, to such an extent that it can be carried by one person or several persons. A power supply facility (see FIG. 3) for power feed mat 100 which will be described later is constructed as being attachable to and removable from power feed mat 100. Power feed mat 100 is flexible to such an extent as being rolled into a cylinder. FIG. 1 shows power feed mat 100 partially rolled into a cylinder. The entire power feed mat 100 can also be rolled into a cylinder. By rolling power feed mat 100 into a cylinder, power feed mat 100 is more easily carried. Power feed mat 100 may be stored as being rolled into a cylinder. Power feed mat 100 can also be developed like a sheet. Power feed mat 100 is used as being developed (see FIG. 2 which will be described later). Power feed mat 100 can be handled as a rug. Power feed mat 100 is constructed as being placed on a floor indoors. Power feed mat 100 may be placed on the floor and thereafter fixed by a removable retainer (for example, retaining hardware or a gripper).

In this embodiment, power feed mat 100 in a developed state has a rectangular outer geometry (two-dimensional shape). The outer geometry of power feed mat 100 is not limited to the rectangular shape but can be modified as appropriate. Power feed mat 100 may have an outer geometry in a polygonal shape (a triangular shape, a pentagonal shape, a hexagonal shape, or the like) other than a quadrangular shape, or a circular shape. In this embodiment, a plurality of power transmission coils 120 included in power feed mat 100 are contained in sheet substrate 110. Without being limited as such, power transmission coils 120 may be provided as being exposed at a surface of power feed mat 100. Sheet substrate 110 is formed, for example, of a resin. A material for sheet substrate 110 can be modified as appropriate. Power transmission coil 120 is formed, for example, of a metal. A material for power transmission coil 120 can be modified as appropriate. Power transmission coil 120 may be formed, for example, of a conductive resin.

In this embodiment, on a mat surface (a main surface of power feed mat 100), the plurality of power transmission coils 120 are regularly disposed in matrix of rows and columns. Power transmission coils 120 are arranged, for example, in grids. Without being limited as such, arrangement of power transmission coils 120 can be modified as appropriate. Power transmission coils 120 may irregularly be arranged. Though power transmission coil 120 is formed in a regular hexagonal shape in a plan view in an example shown in FIG. 1, a shape of power transmission coil 120 can be modified as appropriate. A two-dimensional shape of power transmission coil 120 may be a polygonal shape (for example, a quadrangular shape) other than the hexagonal shape, or a circular shape. A size of power transmission coil 120 may also be modified as appropriate in conformity with an application (for example, a structure of a movable body that uses power feed mat 100) of power feed mat 100.

Figure 2:
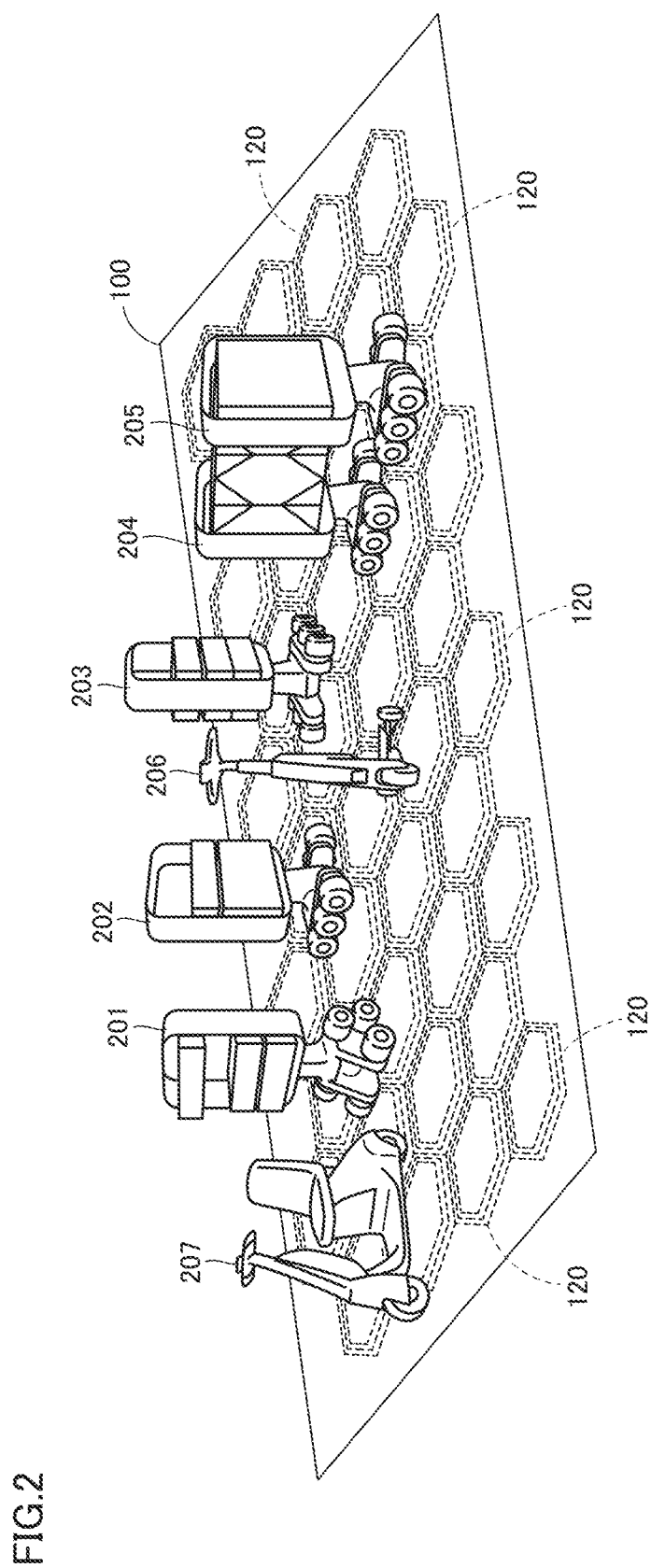
FIG. 2 is a diagram showing an exemplary state during use of the power feed mat shown in FIG. 1.

FIG. 2 is a diagram showing an exemplary state during use of power feed mat 100. In an example shown in FIG. 2, movable bodies 201 and 207 are on power feed mat 100. The plurality of power transmission coils 120 included in power feed mat 100 are configured to individually feed power to different movable bodies. When alignment between any one power transmission coil 120 included in power feed mat 100 and any one of movable bodies 201 to 207 is completed, electric power can wirelessly be fed from power transmission coil 120 that has been aligned to the movable body (any one of movable bodies 201 to 207). Each of movable bodies 201 to 207 can select one of the plurality of power transmission coils 120 included in power feed mat 100 and can be fed with power from selected power transmission coil 120. Any wireless power transmission (WPT) technique may be applicable, and magnetic resonance or electromagnetic induction power transmission may be applicable. Another technique may be adopted.

Each of movable bodies 201 to 207 is a small battery electric vehicle (BEV) configured to travel indoors. Each of movable bodies 201 to 205 is an automated guided vehicle (AGV). Each of movable bodies 206 and 207 is a single-person battery electric vehicle.

Movable bodies 201 to 205 are AGVs of the same type. Each of movable bodies 201 to 205 is used for load transport. In the example shown in FIG. 2, each of movable bodies 201 to 203 carries a load alone. Movable bodies 204 and 205 carry in cooperation, a large load that cannot be carried by one movable body. Each of movable bodies 201 to 205 is suitable for indoor transport. Each of movable bodies 201 to 205 is referred to as an "AGV 200" below unless they are described as being distinguished from one another.

Each of movable bodies 206 and 207 is configured to be adapted to both of manual drive by a driver on-board and autonomous travel without human intervention. Movable body 206 includes a handlebar. Movable body 207 includes a handlebar and a seat. Each of movable bodies 206 and 207 is suitable as a vehicle that moves indoors.

Figure 3:
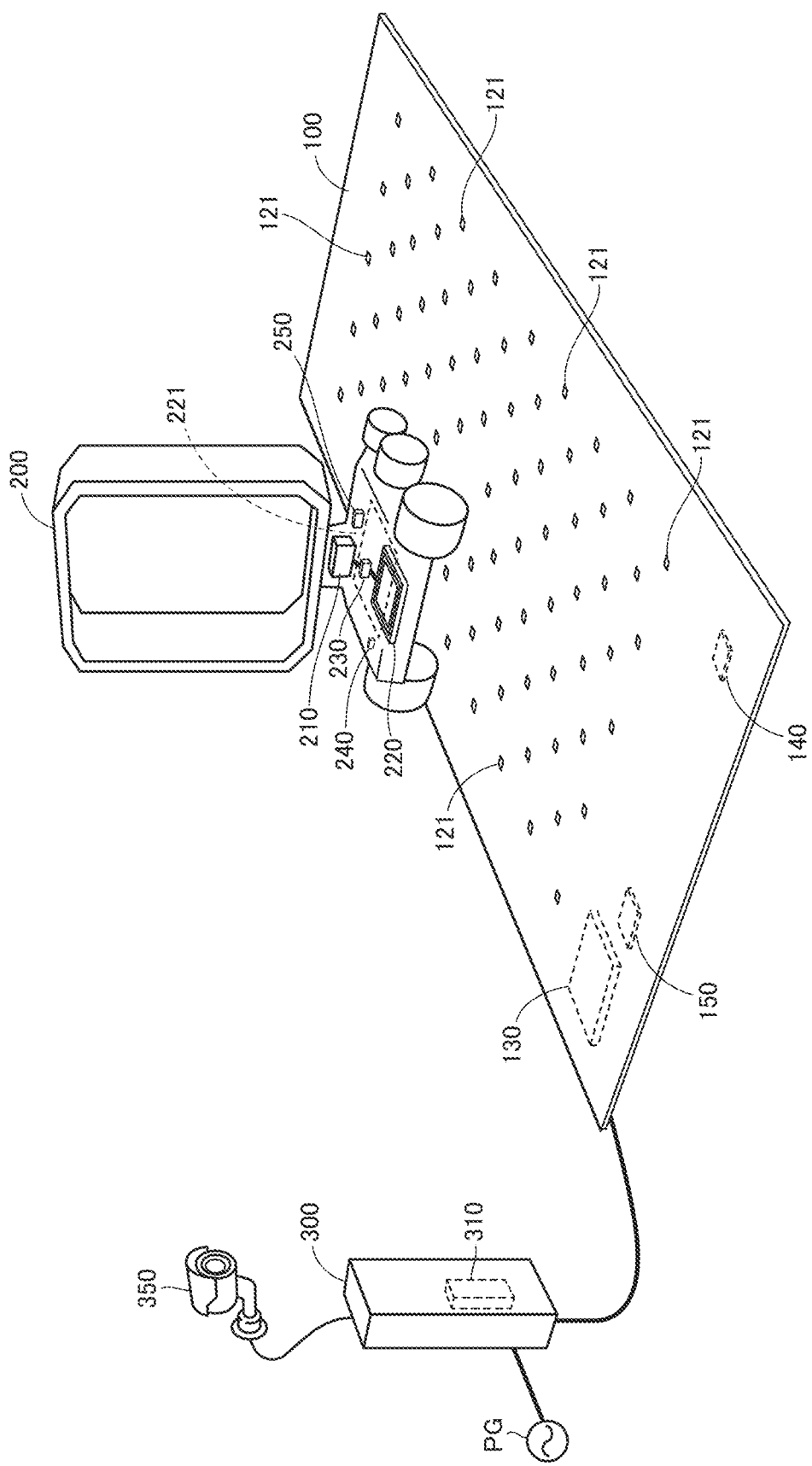
FIG. 3 is a diagram for illustrating a configuration of a movable body and a configuration of a power supply facility of the power feed mat in a power feed system according to the first embodiment of the present disclosure.

FIG. 3 is a diagram for illustrating a configuration of a movable body fed with power from power feed mat 100 and a configuration of a power supply facility of power feed mat 100. A configuration of AGV 200 will be described below by way of example of the movable body.

Referring to FIG. 3 together with FIG. 2, the power feed system according to this embodiment includes power feed mat 100, a power supply module 300, and a camera 350. Power supply module 300 corresponds to the power supply facility of power feed mat 100. Power supply module 300 is electrically connected to power feed mat 100 through a cable. Power supply module 300 includes a power supply circuit 310. Power supply circuit 310 is configured to receive supply of electric power from a power grid PG and to supply electric power to each of the plurality of power transmission coils 120 included in power feed mat 100. Power grid PG is an electric power network constructed of a power plant and a power transmission and distribution facility that are not shown. Power grid PG supplies alternating-current (AC) power (for example, three-phase AC power) to power supply module 300. Power supply circuit 310 includes a power conversion circuit. Power supply circuit 310 converts electric power supplied from power grid PG into electric power suitable for power feed mat 100 and supplies resultant electric power to power feed mat 100.

Camera 350 is configured to receive supply of electric power from power supply module 300 and to pick up an image of an area around power feed mat 100 from above power feed mat 100. Power supply module 300 includes also a power supply circuit (not shown) for camera 350 in addition to power supply circuit 310 for power feed mat 100. Camera 350 may be attached to a wall. Alternatively, a post on which camera 350 is supported may be provided. Camera 350 contains, in addition to an image pick-up element, a processor and an image processing circuit that analyze video images obtained by the image pick-up element. Camera 350 picks up an image of the entire surface of power feed mat 100 and identifies an object (a living body or a substance) present on power feed mat 100. Camera 350 monitors a state of power feed mat 100.

Power feed mat 100 further includes in the inside of sheet substrate 110 (FIG. 1), a plurality of magnetic markers 121, a power control circuit 130, a wireless communication instrument 140, and a mat controller 150 that controls power control circuit 130. A computer including a processor, a random access memory (RAM), a storage, and a communication interface (I/F) can be adopted as mat controller 150. In this embodiment, various types of control in power feed mat 100 are carried out by execution by the processor of a program stored in a storage in mat controller 150. Various types of control in power feed mat 100 are not limited to control carried out by software but can also be carried out by dedicated hardware (electronic circuitry).

Power control circuit 130 includes a connection switching circuit. This connection switching circuit is configured to receive supply of electric power from power supply circuit 310 and to switch between connection and disconnection between each power transmission coil 120 included in power feed mat 100 and power supply circuit 310. The connection switching circuit of power control circuit 130 may include a switch provided for each power transmission coil 120. In this embodiment, the connection switching circuit is a normally-off switching circuit. While mat controller 150 is in a non-operating state (including a sleep state), each power transmission coil 120 included in power feed mat 100 and power supply circuit 310 are disconnected from each other.

Power control circuit 130 further includes a power conversion circuit. This power conversion circuit is configured to apply a voltage suitable for wireless power feed to each power transmission coil 120 electrically connected to power supply circuit 310. Specifically, the power conversion circuit of power control circuit 130 may include a resonance circuit (for example, an LC resonance circuit), a filter circuit, an inverter, and a power factor correction (PFC) circuit. Though details will be described later, mat controller 150 can also control power control circuit 130 such that weak electric power (electric power for checking a position) is transmitted from any power transmission coil 120 included in power feed mat 100.

In power feed mat 100, mat controller 150 sends a control signal to power control circuit 130 to be able to determine or change each of a power feed target (a movable body that receives power feed from power feed mat 100) and a restriction target (a movable body power feed to which is to be restricted).

A plurality of magnetic markers 121 are provided in correspondence with the plurality of power transmission coils 120, respectively. In other words, magnetic marker 121 is provided for each power transmission coil 120 included in power feed mat 100. Magnetic marker 121 indicates a position of corresponding power transmission coil 120. By detecting magnetism emitted from magnetic marker 121 with a magnetic sensor, the movable body can detect the position of power transmission coil 120 corresponding to magnetic marker 121.

In the inside of a cable through which power feed mat 100 and power supply module 300 are connected to each other, not only a power line but also a communication line is provided. In this embodiment, power feed mat 100 and power supply module 300 are configured to communicate with each other. Mat controller 150 is configured to control power supply circuit 310 in power supply module 300. Camera 350 is communicatively connected to power feed mat 100 with power supply module 300 being interposed. Information obtained by camera 350 is provided to mat controller 150 through power supply module 300.

AGV 200 includes a battery 210, a power reception coil 220 that wirelessly receives electric power from power transmission coil 120, a charging circuit 230 that charges battery 210 with electric power received by power reception coil 220, a wireless communication instrument 240, and an electronic control unit (ECU) 250 that controls charging circuit 230. Battery 210 and ECU 250 in AGV 200 correspond to an exemplary "power storage" and an exemplary "first controller" according to the present disclosure, respectively.

A known power storage for a vehicle (for example, a liquid secondary battery, an all-solid secondary battery, or a battery assembly) can be adopted as battery 210. Examples of the secondary battery for the vehicle include a lithium ion battery and a nickel metal hydride battery. Instead of the secondary battery, another power storage such as an electric double layer capacitor may be adopted. Charging circuit 230 functions as a vehicle-mounted charger of battery 210. A computer including a processor, a RAM, a storage, and a communication I/F can be adopted as ECU 250. In this embodiment, various types of control in AGV 200 are carried out by execution by the processor of a program stored in the storage in ECU 250. Various types of control in AGV 200 are not limited to control carried out by software but can also be carried out by dedicated hardware (electronic circuitry).

AGV 200 is an autonomous vehicle configured to travel with electric power stored in battery 210 without human intervention. Though not shown, AGV 200 further includes an electric motor, a battery management system (BMS), an autonomous driving sensor, and a navigation system including map information. AGV 200 travels with motive power generated by the electric motor by supply of electric power to the electric motor from battery 210. The BMS includes various sensors that detect a state (for example, a current, a voltage, and a temperature) of battery 210 and a result of detection is provided to ECU 250. For example, the BMS detects charging power (a charging current and a charging voltage) of battery 210. The BMS estimates a state of charge (SOC) of battery 210 and a result of estimation is provided to ECU 250.

The autonomous driving sensor is a sensor used for autonomous driving. The autonomous driving sensor, however, may be used for prescribed control while autonomous driving is not being carried out. The autonomous driving sensor includes a sensor that obtains information for recognizing an environment outside AGV 200 and a sensor that obtains information on a position and an attitude of AGV 200. The autonomous driving sensor may include, for example, at least one of a camera, a millimeter wave radar, and a lidar. The autonomous driving sensor may include, for example, at least one of an inertial measurement unit (IMU) and a global positioning system (GPS) sensor.

AGV 200 is configured to autonomously travel in accordance with a prescribed travel schedule without human intervention. The travel schedule includes, for example, time of departure for a destination and time of arrival at the destination. The travel schedule may be set with any method. For example, a user may operate a user terminal (for example, a mobile terminal) capable of wirelessly communicating with AGV 200 to set a travel schedule and a destination in ECU 250. Alternatively, the user may operate a service tool connected to establish wired communication with AGV 200 or a human machine interface (HMI) of AGV 200 to set a travel schedule and a destination in ECU 250.

ECU 250 is configured to carry out autonomous driving (including autonomous parking) in accordance with a prescribed autonomous driving program. ECU 250 controls an accelerator, a brake, and a steering apparatus (none of which is shown) of AGV 200 based on various types of information obtained by the autonomous driving sensor, to thereby carry out autonomous driving of AGV 200. The autonomous driving program may sequentially be updated by Over the Air (OTA).

Charging circuit 230 is located between battery 210 and power reception coil 220 and controlled by ECU 250. Charging circuit 230 includes a power conversion circuit. When battery 210 is charged with electric power supplied from power transmission coil 120 to power reception coil 220, ECU 250 controls charging circuit 230 such that appropriate electric power is provided from power reception coil 220 to battery 210. Charging circuit 230 converts AC power provided from power reception coil 220 into direct-current (DC) power and provides DC power to battery 210. Specifically, charging circuit 230 may include a resonance circuit (for example, an LC resonance circuit), a filter circuit, and a rectification circuit.

AGV 200 further includes a position sensor module 221 that detects a position of AGV 200 on the mat surface (the main surface of power feed mat 100). Position sensor module 221 is used, for example, for alignment between any power transmission coil 120 (magnetic marker 121) of power feed mat 100 and power reception coil 220. Position sensor module 221 is provided, for example, on a bottom surface of AGV 200. Position sensor module 221 includes a plurality of magnetic sensors. The plurality of magnetic sensors may be arranged in grids. Each magnetic sensor included in position sensor module 221 detects magnetism emitted from magnetic marker 121. ECU 250 is configured to obtain an amount of position displacement between power transmission coil 120 and power reception coil 220 based on a result of detection by position sensor module 221.

In this embodiment, power feed mat 100 and AGV 200 are configured to communicate with each other. Mat controller 150 and ECU 250 may wirelessly communicate with each other through wireless communication instruments 140 and 240. Any communication method is applicable. Mat controller 150 and ECU 250 may be configured to establish short-range communication (for example, direct communication within an area around power feed mat 100) such as near field communication (NFC) or Bluetooth®. Alternatively, mat controller 150 and ECU 250 may be configured to wirelessly communicate with each other by using a wireless local area network (LAN). AGV 200 may include a radio frequency identification (RFID) apparatus. Then, mat controller 150 may be configured to receive a signal emitted from the RFID apparatus of AGV 200.

Though the configuration of AGV 200 is described above, each of movable bodies 206 and 207 shown in FIG. 2 also contains a configuration similar to the configuration shown in FIG. 3. The circuit configuration described above may be modified as necessary to perform similar functions.

Figure 4:
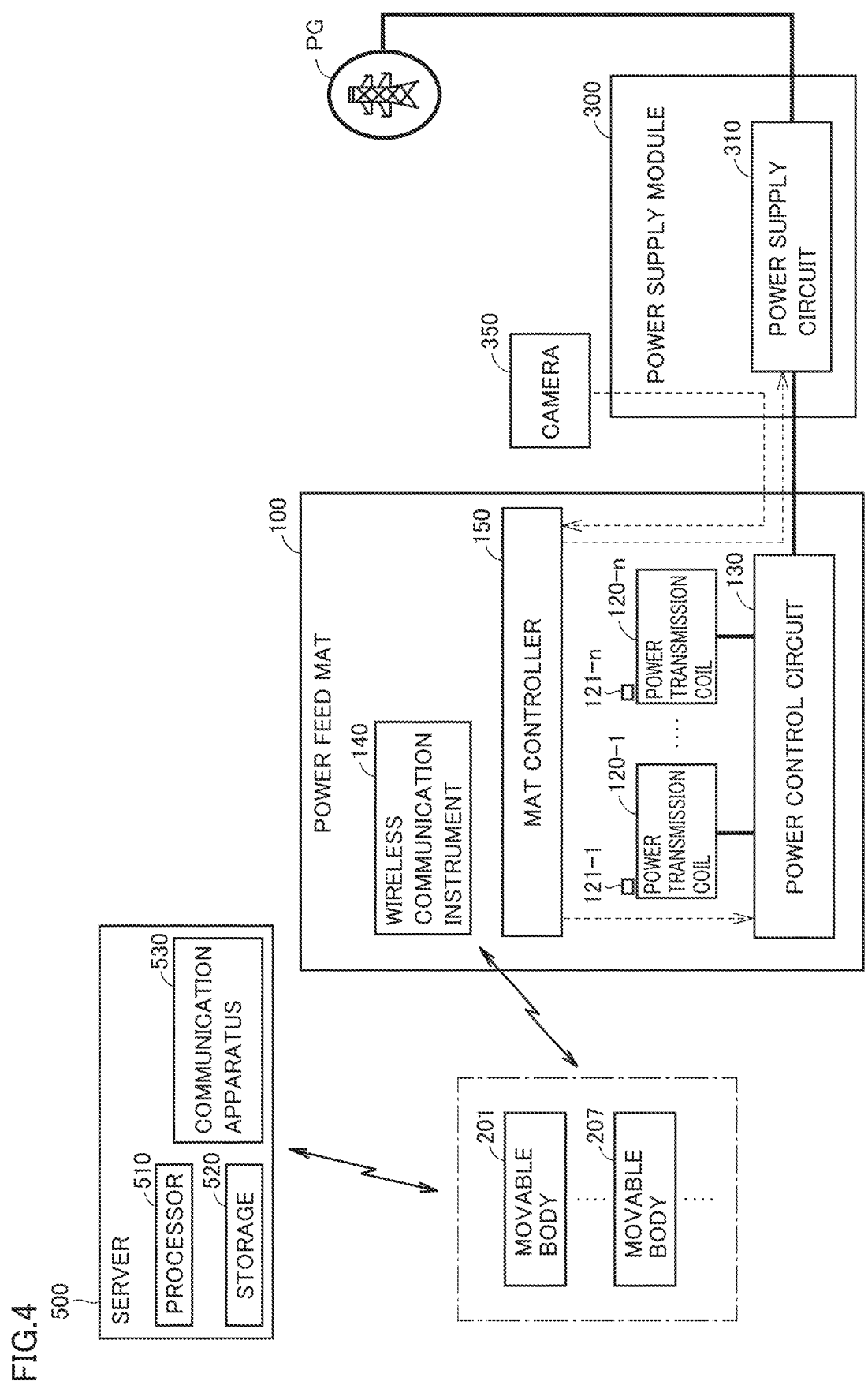
FIG. 4 is a diagram showing an overall configuration of the power feed system according to the first embodiment of the present disclosure.

FIG. 4 is a diagram showing an overall configuration of the power feed system according to the this embodiment. Referring to FIG. 4, the power feed system according to this embodiment further includes a server 500 in addition to power feed mat 100 and power supply module 300 described above. Server 500 is configured to wirelessly communicate with each of the plurality of subject movable bodies adapted to power feed mat 100. Each of movable bodies 201 to 207 shown in FIG. 2 corresponds to the subject movable body adapted to power feed mat 100. The subject movable body adapted to power feed mat 100 is configured to be able to use power feed mat 100. In this embodiment, information on each subject movable body (including movable bodies 201 to 207) adapted to power feed mat 100 is registered in advance in server 500. A movable body which is not the subject movable body adapted to power feed mat 100 can also be registered in server 500. As information on each movable body is registered in server 500, management of information on each movable body is facilitated. Server 500 may wirelessly communicate not only with a registered movable body but also with a movable body that has not been registered. Server 500 may obtain through communication, information on a movable body that has not yet been registered. Server 500 according to this embodiment corresponds to an exemplary "computer" according to the present disclosure.

Server 500 includes a processor 510, a storage 520, and a communication apparatus 530. Processor 510 may be implemented by a central processing unit (CPU). Storage 520 is configured such that various types of information can be stored therein. Communication apparatus 530 includes various communication I/Fs. Server 500 is configured to communicate with the outside through communication apparatus 530.

Not only a program to be executed by processor 510 but also information (for example, a map, a mathematical expression, and various parameters) to be used by a program is stored in storage 520. As a program stored in storage 520 is executed by processor 510, various types of processing in server 500 are performed in this embodiment. Various types of processing in server 500 are not limited to processing performed by software but can also be performed by dedicated hardware (electronic circuitry).

In server 500, a plurality of movable bodies (including the subject movable body adapted to power feed mat 100) and a plurality of power feed mats (for example, power feed mat 100 shown in FIGS. 1 to 3) are registered. Server 500 manages information on each registered movable body (which is referred to as "movable body information" below) and information on each registered power feed mat (which is referred to as "mat information" below). The movable body information and the mat information are stored in storage 520. The movable body information and the mat information are updated any time.

Identification information (a movable body ID) for identifying a movable body is provided for each movable body, and server 500 manages the movable body information as being distinguished based on the movable body ID. The movable body information includes, for example, specifications (for example, specs relating to charging) of the movable body, a mat ID of the power feed mat to which the movable body is adapted, and information (for example, current position and state of the movable body) that server 500 receives from the movable body. The movable body information may include charging power (kW) requested by the movable body.

Identification information (a mat ID) for identifying a power feed mat is provided for each power feed mat, and server 500 manages the mat information as being distinguished based on the mat ID. The mat information includes specifications (for example, specs relating to power feed) of the power feed mat and a position (an installation location) of the power feed mat. The mat information may include specifications of the power supply facility of the power feed mat and rated output (kW) of each power transmission coil included in the power feed mat.

In this embodiment, power feed mat 100 includes n power transmission coils 120 (power transmission coils 120-1 to 120-n) and n magnetic markers 121 (magnetic markers 121-1 to 121-n), n being an integer not smaller than two. n may be an integer selected from a range not smaller than five and smaller than one hundred. n may be not smaller than one hundred. The number (n) of power transmission coils 120 included in power feed mat 100 according to this embodiment is set to approximately one hundred.

Figure 5:
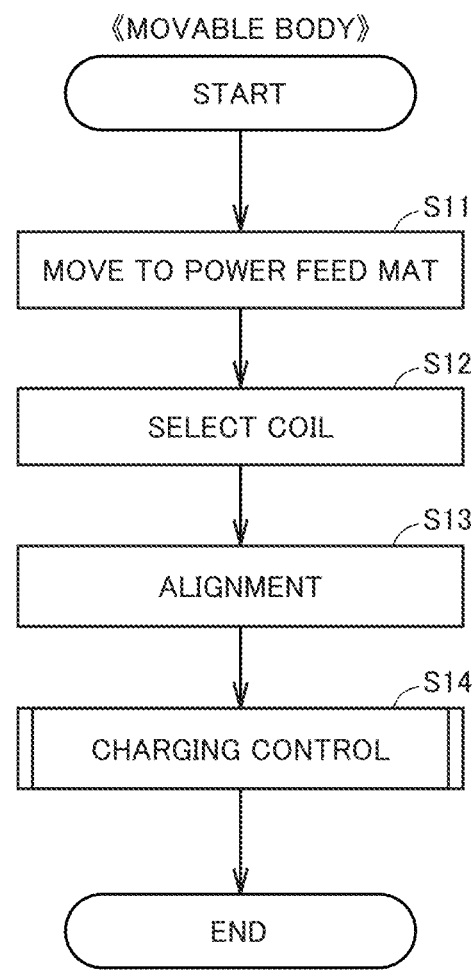
FIG. 5 is a flowchart showing processing involved with travel control and charging control performed by the movable body for receiving power feed from the power feed mat in the power feed system according to the first embodiment of the present disclosure.

FIG. 5 is a flowchart showing processing involved with travel control and charging control performed by the movable body for receiving power feed from power feed mat 100. Processing shown in this flowchart is performed when a prescribed charging start condition is satisfied. The prescribed charging start condition is satisfied, for example, when an SOC of the power storage included in the movable body becomes equal to or smaller than a prescribed SOC value. The prescribed SOC value may be selected from a range from 5% to 30%. The prescribed SOC value may be variable depending on a distance between the movable body and power feed mat 100.

In this embodiment, when the SOC of the power storage (battery 210) included in each of movable bodies 201 to 207 shown in FIG. 2 becomes equal to or smaller than the prescribed SOC value, each of the movable bodies performs processing shown in FIG. 5 which will be described below. Then, each movable body moves toward power feed mat 100 in accordance with the processing shown in FIG. 5, and when each movable body arrives at power feed mat 100, it selects one of the plurality of power transmission coils 120 included in power feed mat 100 and aligns selected power transmission coil 120 and power reception coil 220 with each other. Each step in the flowchart is simply denoted as "S" below. Though an example in which AGV 200 performs the processing shown in FIG. 5 is described below, another movable body (for example, movable body 206 or 207 shown in FIG. 2) also performs the processing shown in FIG. 5.

Referring to FIG. 5 together with FIGS. 3 and 4, in S11, AGV 200 moves toward power feed mat 100 by autonomous driving. When power feed mats 100 are provided at a plurality of locations, AGV 200 moves toward closest power feed mat 100. Then, when AGV 200 arrives at power feed mat 100, processing in S12 is performed.

When movable body 206 or 207 where a driver is on board performs a series of processing shown in FIG. 5, the driver may drive in accordance with guidance from a navigation system mounted on the movable body to move to power feed mat 100. When the movable body arrives at power feed mat 100, the navigation system may instruct the driver to move away from power feed mat 100 by voice and sound.

In S12, ECU 250 selects which of power transmission coils 120 is to be used from among power transmission coils 120 that are included in power feed mat 100 and are not being used (power transmission coils 120 that are not feeding power). Any method of selecting power transmission coil 120 is applicable. Specifically, ECU 250 may select power transmission coil 120 closest to AGV 200. ECU 250 may select power transmission coil 120 with which AGV 200 can easily achieve alignment. ECU 250 may select power transmission coil 120 around the center of power feed mat 100. ECU 250 may select power transmission coil 120 that is not being used and is located at a position distant from power transmission coil 120 that is feeding power (being used). Power transmission coil 120 selected in S12 is also referred to as a "subject coil" below.

In following S13, ECU 250 has AGV 200 move by autonomous driving such that the position of power reception coil 220 is aligned with the position of the subject coil indicated by magnetic marker 121. ECU 250 has AGV 200 move to the subject coil, for example, based on information obtained by the autonomous driving sensor, and thereafter finely adjusts the position of AGV 200 based on a result of detection by position sensor module 221 such that a reference position (for example, the center) of the subject coil coincides with a reference position (for example, the center) of power reception coil 220. A method of alignment between the power transmission coil and the power reception coil is not limited to the above. For example, ECU 250 may wirelessly communicate with mat controller 150 to notify mat controller 150 of the subject coil, and thereafter has AGV 200 move in accordance with guidance from mat controller 150 to achieve alignment between the power transmission coil and the power reception coil.

Figure 6:
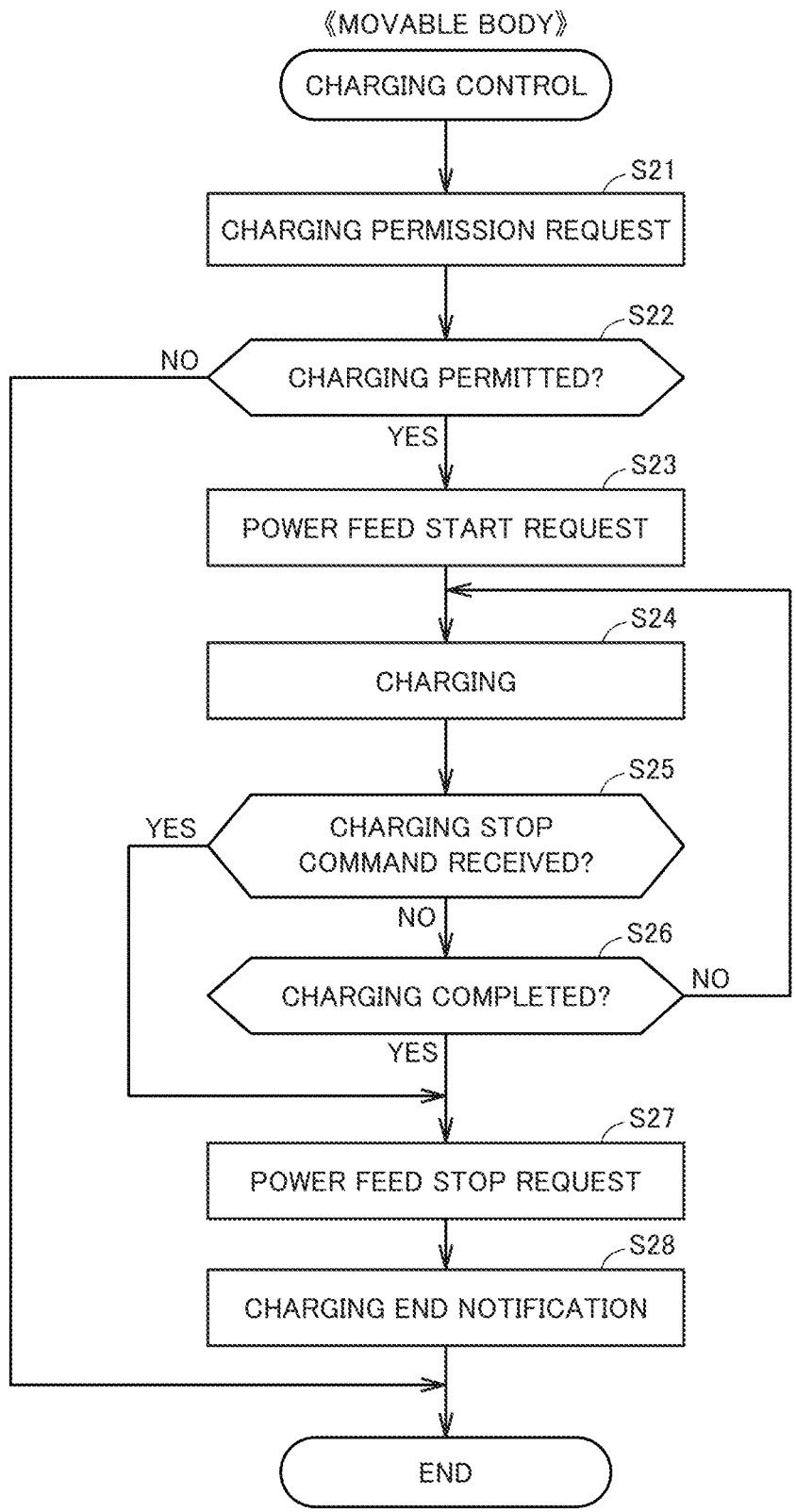
FIG. 6 is a flowchart showing details of processing in S14 shown in FIG. 5.

In following S14, ECU 250 carries out charging control. FIG. 6 is a flowchart showing details of processing in S14 shown in FIG. 5.

Referring to FIG. 6 together with FIGS. 3 and 4, in S21, ECU 250 communicates with mat controller 150 to obtain a mat ID of power feed mat 100, and thereafter transmits a charging permission request (a signal requesting charging permission) to server 500 together with the mat ID of power feed mat 100, the movable body ID of AGV 200, and a state of AGV 200. In this embodiment, the state of AGV 200 transmitted from AGV 200 to server 500 includes the SOC of battery 210.

In following S22, ECU 250 determines whether or not AGV 200 has received charging permission from server 500 within a prescribed time period since the processing in S21 was performed. In this embodiment, reception by AGV 200 of a permission signal (S44 or S45 in FIG. 8) which will be described later from server 500 means reception of charging permission from server 500 by AGV 200. Therefore, when AGV 200 has received the permission signal from server 500 within the prescribed time period since the processing in S21 was performed, determination as YES is made in S22 and the process proceeds to S23. When determination as NO is made in S22, a series of processing shown in FIG. 6 ends.

In S23, ECU 250 transmits a power feed start request to power feed mat 100 together with the movable body ID of AGV 200. Then, when ECU 250 receives a power feed start notification (S33 in FIG. 7) which will be described later from power feed mat 100, in S24, ECU 250 has battery 210 charged while ECU 250 communicates with mat controller 150. Battery 210 is charged with electric power supplied from the subject coil (S12 and S13 in FIG. 5) of power feed mat 100 to power reception coil 220 of AGV 200. During charging of battery 210, mat controller 150 controls power control circuit 130 to adjust feed power and ECU 250 controls charging circuit 230 to adjust charging power.

As set forth above, when alignment (see S13 in FIG. 5) between power reception coil 220 and any power transmission coil 120 included in power feed mat 100 is completed and ECU 250 receives the permission signal from server 500 (YES in S22), ECU 250 carries out control for starting charging of battery 210 (S23 and S24). When ECU 250 does not receive the permission signal from server 500 (NO in S22), ECU 250 does not start charging of battery 210.

In following S25, ECU 250 determines whether or not AGV 200 has received from server 500, a charging stop command which will be described later. When AGV 200 has not received the charging stop command (NO in S25), the process proceeds to S26. In S26, ECU 250 determines whether or not a prescribed charging completion condition has been satisfied. In this embodiment, the charging completion condition is satisfied when the SOC of battery 210 becomes equal to or larger than a prescribed SOC value (for example, an SOC value indicating full charge). Without being limited as such, any charging completion condition can be set. For example, the charging completion condition may be satisfied when a prescribed time period has elapsed since start of charging.

Processing in S24 is continued while determination as NO is made in both of S25 and S26. When power feed from the subject coil in power feed mat 100 to power reception coil 220 of AGV 200 is continued, battery 210 is charged in the processing in S24. When power feed from power feed mat 100 is unexpectedly stopped, ECU 250 may align the power transmission coil and the power reception coil with each other again (S13 in FIG. 5) and thereafter transmit again the power feed start request (S23 in FIG. 6) to power feed mat 100. When AGV 200 receives the charging stop command (YES in S25) or the charging completion condition is satisfied (YES in S26), the process proceeds to S27 and the processing in S24 is no longer performed. Battery 210 is thus no longer charged.

In S27, ECU 250 transmits a power feed stop request to power feed mat 100. Thereafter, in S28, ECU 250 transmits a charging end notification indicating that permitted charging has ended to server 500. As processing in S28 is performed, the series of processing shown in FIG. 6 ends. The series of processing shown in FIG. 5 thus also ends. When a destination has been set in AGV 200, AGV 200 resumes travel toward the destination.

In this embodiment, when no movable body is present within a prescribed area around power feed mat 100, mat controller 150 of power feed mat 100 is in a non-operating state (for example, in a sleep state). Then, when a first movable body enters the prescribed area, mat controller 150 is activated. For example, when camera 350 recognizes a movable body around power feed mat 100, the movable body may be determined as having entered the prescribed area. Alternatively, when wireless communication instrument 140 receives a signal emitted from the RFID apparatus of the movable body, the movable body may be determined as having entered the prescribed area. Alternatively, the power feed system may be configured to determine whether or not the movable body has entered the prescribed area based on a geofencing technology.

Figure 7:
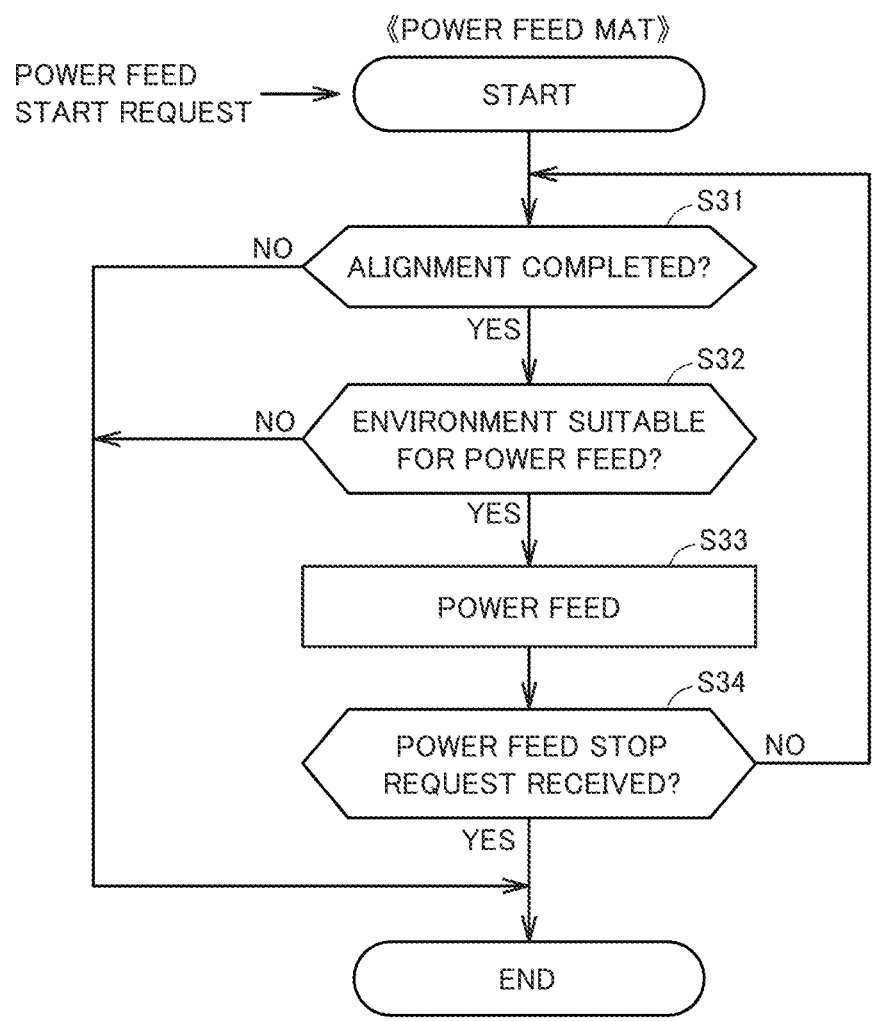
FIG. 7 is a flowchart showing processing involved with power feed control performed by a mat controller in the power feed system according to the first embodiment of the present disclosure.

FIG. 7 is a flowchart showing processing involved with power feed control carried out by mat controller 150. Processing shown in this flowchart is performed for a movable body when mat controller 150 receives a power feed start request (S23 in FIG. 6) from that movable body. When mat controller 150 receives power feed start requests from a plurality of movable bodies, a series of processing shown in FIG. 7 is performed in parallel among the movable bodies. Though an example in which the processing shown in FIG. 7 is performed for AGV 200 will be described below, the processing shown in FIG. 7 is performed also for another movable body (for example, movable body 206 or 207 shown in FIG. 2).

Referring to FIG. 7 together with FIGS. 3 and 4, in S31, mat controller 150 determines whether or not the position of the subject coil (S12 in FIG. 5) and the position of power reception coil 220 are aligned with each other. Mat controller 150 may determine the subject coil based on information obtained from camera 350 or outputs from various sensors (for example, a not-shown load sensor) mounted on power feed mat 100. Alternatively, mat controller 150 may receive a signal indicating the subject coil from AGV 200 (ECU 250).

When wireless power feed (see S33 which will be described later) has not yet been started, in S31, mat controller 150 controls power control circuit 130 such that weak electric power is transmitted from the subject coil toward power reception coil 220. Weak electric power is electric power for checking a position that is lower than electric power fed from the subject coil during charging. Then, mat controller 150 checks whether or not electric power has appropriately been transmitted from the subject coil to power reception coil 220 based on information (for example, electric power received by power reception coil 220) from ECU 250. When electric power is appropriately transmitted from the subject coil to power reception coil 220, mat controller 150 determines that the position of the subject coil and the position of power reception coil 220 are aligned with each other. Mat controller 150 performs processing in S31 also during wireless power feed. In this case, mat controller 150 determines whether or not the position of the subject coil and the position of power reception coil 220 are aligned with each other based on information (for example, electric power received by power reception coil 220) from ECU 250 while feed power (electric power transmitted for charging) rather than weak electric power is transmitted from the subject coil to power reception coil 220.

When the position of the subject coil and the position of power reception coil 220 are displaced from each other beyond an acceptable level (NO in S31), the series of processing shown in FIG. 7 ends. When the position of the subject coil and the position of power reception coil 220 are aligned with each other (YES in S31), the process proceeds to S32. In S32, mat controller 150 determines whether or not an environment is suitable for wireless power feed. Mat controller 150 may determine whether or not the environment is suitable for wireless power feed based on information obtained from camera 350 or outputs from various sensors (for example, a load sensor and a temperature sensor that are not shown) mounted on power feed mat 100. For example, mat controller 150 determines whether or not the environment is suitable based on whether or not there is an object (which is referred to as a "foreign matter" below) other than a movable body. Examples of the foreign matter include not only a substance such as a metal piece but also a living being (for example, a human). In this embodiment, when a foreign matter is present on power feed mat 100, in S32, the environment of power feed mat 100 is determined as not being suitable for wireless power feed. When there is no foreign matter on power feed mat 100, in S32, the environment of power feed mat 100 is determined as being suitable for wireless power feed. Without being limited to the example above, mat controller 150 may determine suitability of the environment from a point of view other than presence of a foreign matter.

When the environment of power feed mat 100 is suitable for wireless power feed (YES in S32), mat controller 150 transmits the power feed start notification to AGV 200 (ECU 250), and thereafter, in S33, mat controller 150 has electric power wirelessly fed while it communicates with ECU 250. Processing in S33 is performed in parallel to processing in S24 in FIG. 6. Electric power is thus supplied from power transmission coil 120 of power feed mat 100 to power reception coil 220 of AGV 200, and electric power received by power reception coil 220 is provided to battery 210 through charging circuit 230. During wireless power feed (that is, during charging of battery 210), mat controller 150 controls power control circuit 130 to adjust feed power.

In following S34, mat controller 150 determines whether or not power feed mat 100 has received the power feed stop request (S27 in FIG. 6) from AGV 200. When power feed mat 100 has not received the power feed stop request (NO in S34), the process returns to S31.

Wireless power feed (S33) is continued while determination as YES is made in both of S31 and S32 and determination as NO is made in S34. When determination as NO is made in any of S31 and S32 or when determination as YES is made in S34, the series of processing shown in 7 ends. Wireless power feed (S33) is thus no longer carried out.

Figure 8:
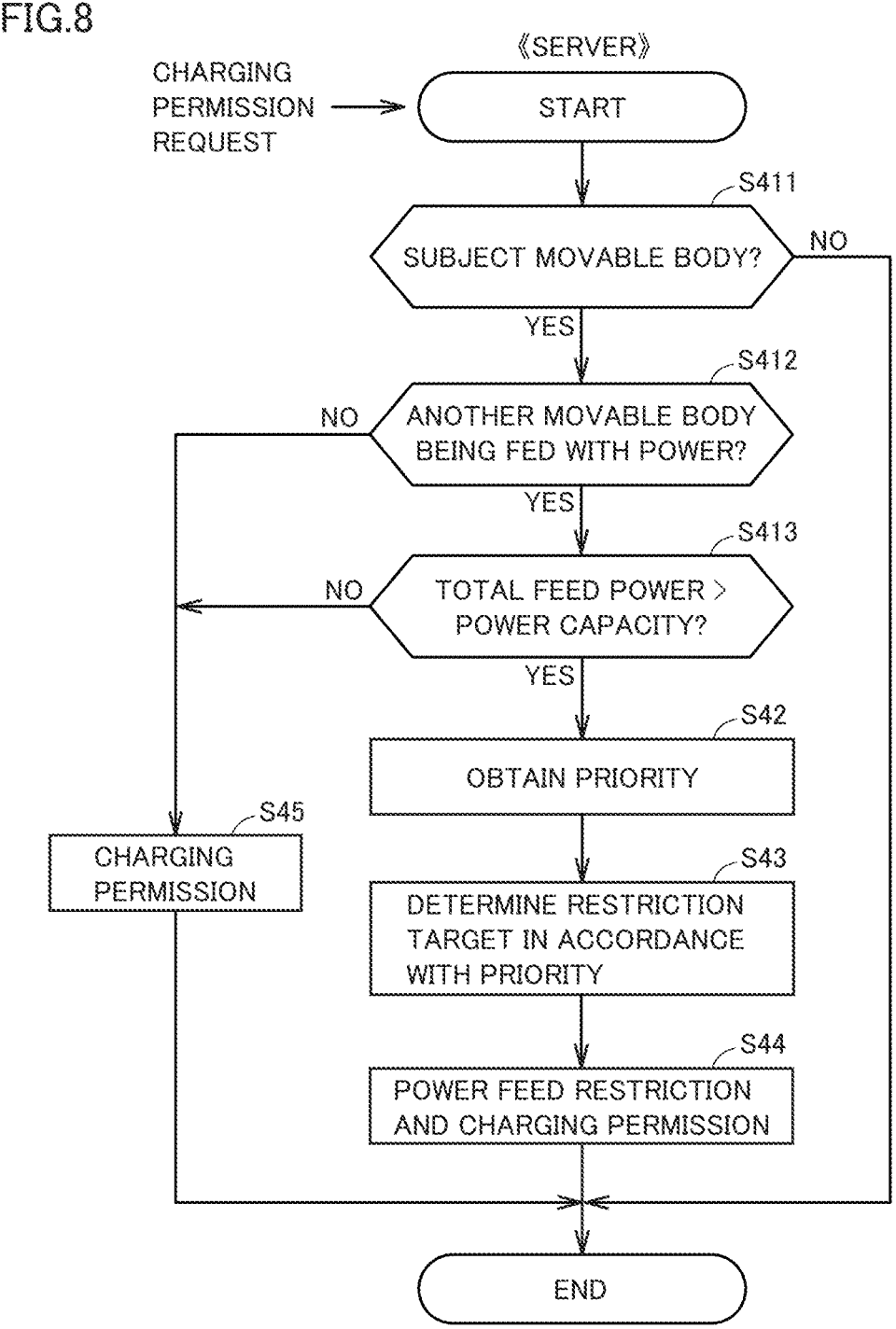
FIG. 8 is a flowchart showing processing involved with charging permission performed by a server in the power feed system according to the first embodiment of the present disclosure.

FIG. 8 is a flowchart showing processing involved with charging permission performed by server 500. Processing shown in this flowchart is performed for a movable body when server 500 receives the charging permission request (S21 in FIG. 6) from that movable body. When server 500 receives charging permission requests from a plurality of movable bodies, a series of processing shown in FIG. 8 is performed in parallel among the movable bodies. Though an example in which processing shown in FIG. 8 is performed for AGV 200 will be described below, the processing shown in FIG. 8 is performed also for another movable body (for example, movable body 206 or 207 shown in FIG. 2).

Referring to FIG. 8 together with FIGS. 3 and 4, in S411, server 500 determines whether or not AGV 200 that requests power feed is adapted to power feed mat 100 (which is also referred to as a "subject mat" below) from which AGV 200 attempts to receive power feed. In other words, server 500 determines whether or not AGV 200 that requests power feed falls under the subject movable body. Server 500 can identify a subject mat based on the mat ID (S21 in FIG. 6) received from AGV 200. Server 500 can determine whether or not AGV 200 that requests power feed falls under the subject movable body, for example, based on registered movable body information.

When AGV 200 that requests power feed has not been registered in server 500, server 500 may obtain prescribed information (for example, at least one of a type of the movable body, a capacity of the power storage, and charging power) on AGV 200 from AGV 200. Server 500 may determine whether or not AGV 200 falls under the subject movable body based on charging power (kW) requested by AGV 200. When charging power (kW) requested by AGV 200 is higher than rated output (kW) of the subject coil of the subject mat, server 500 may determine AGV 200 that requests power feed as not falling under the subject movable body. Server 500 can check the specifications of the subject mat by referring to the registered mat information. Server 500 may estimate charging power (kW) requested by AGV 200 based on the capacity (kWh) of the power storage included in AGV 200. Server 500 may estimate charging power (kW) requested by the movable body based on a type (for example, a model) of the movable body. A movable body larger in physical build tends to request higher charging power (kW).

When AGV 200 that requests power feed does not fall under the subject movable body (NO in S411), a series of processing shown in FIG. 8 ends. In other words, server 500 does not send the permission signal back in response to the charging permission request from AGV 200. In AGV 200 that does not receive the permission signal, control for starting charging of battery 210 is not carried out (see S22 in FIG. 6).

On the other hand, when AGV 200 that requests power feed falls under the subject movable body (YES in S411), the process proceeds to S412. In S412, server 500 determines whether or not the subject mat is feeding power to another movable body (a movable body other than AGV 200 that requests power feed). Server 500 can obtain the number of movable bodies being fed with power from the subject mat by subtracting the number of times of reception of the charging end notification (see S28 in FIG. 6) from the number of times of charging permission (see S44 and S45 which will be described later). In order to distinguish from a movable body being fed with power from the subject mat, AGV 200 that requests power feed (that is, a movable body that has transmitted the charging permission request) is also referred to as a "new movable body" below. Another movable body being fed with power from the subject mat is also referred to as a "movable body being charged." Both of the new movable body and the movable body being charged are on the subject mat at a time point when server 500 receives the charging permission request from the new movable body.

When the subject mat is feeding power to another movable body (YES in S412), the process proceeds to S413. In S413, server 500 determines whether or not total feed power (that is, a total value of electric power consumed in power feed in the subject mat) in the subject mat exceeds the power capacity of the subject mat if power is fed simultaneously to all of the new movable body and the movable body being charged. Server 500 may make determination in S413, for example, based on the registered movable body information and mat information. Alternatively, server 500 may make determination in S413 based on information obtained from the subject mat and each movable body in addition to or instead of the registered information. The power capacity of the subject mat can be expressed, for example, with rated output (kW) of the subject mat. Rated output (kW) of the subject mat is determined based on specifications of the power supply facility (including power supply module 300) of the subject mat.

When total feed power in the subject mat does not exceed the power capacity of the subject mat even if power is fed simultaneously to all of the new movable body and the movable body being charged (NO in S413), the process proceeds to S45. When the subject mat is not feeding power as well (NO in S412), the process proceeds to S45. In S45, server 500 transmits a permission signal to AGV 200. The permission signal is a signal indicating charging permission to AGV 200. AGV 200 that has received the permission signal carries out control for starting charging of battery 210 (see S22 to S24 in FIG. 6). As processing in S45 is performed, the series of processing shown in FIG. 8 ends.

On the other hand, when total feed power in the subject mat exceeds the power capacity of the subject mat if power is fed simultaneously to the new movable body and the movable body being charged (YES in S413), in S42, server 500 obtains a priority of each movable body (the new movable body and the movable body being charged) on the subject mat. Specifically, server 500 obtains a remaining amount of stored power (SOC) from each movable body being charged and compares that remaining amount of stored power with a remaining amount of stored power (that is, the SOC of battery 210 sent as a result of processing in S21 in FIG. 6) of the new movable body. Then, server 500 determines the priority of each movable body such that the movable body smaller in remaining amount of stored power is higher in priority.

In following S43, server 500 determines a movable body power feed to which is permitted and a movable body power feed to which is restricted based on the priority of each movable body determined in S42. Thereafter, in S44, server 500 restricts power feed (more specifically, prohibits power feed) to a restriction target selected in S43.

The number of restriction targets selected in S43 is determined such that total electric power of the subject mat is lower than the power capacity of the subject mat. When total electric power in the subject mat does not become lower than the power capacity of the subject mat in spite of power feed restriction on the movable body lowest in priority alone, server 500 restricts power feed also to a movable body second lowest in priority. As server 500 restricts power feed in S44 by selecting a necessary number (the number set such that total electric power fed from the subject mat is lower than the power capacity) of movable bodies in the ascending order of priority in S43, total electric power in the subject mat exceeding the power capacity of the subject mat is suppressed.

When the new movable body is included in the restriction target selected in S43, in S44, server 500 does not permit the new movable body to be charged. In other words, server 500 does not send back the permission signal in response to the charging permission request from the new movable body. In the new movable body that does not receive the permission signal, control for starting charging of battery 210 is not carried out (see S22 in FIG. 6).

On the other hand, when the new movable body is not included in the restriction target selected in S43, in S44, server 500 transmits the permission signal to the new movable body. In the new movable body that has received the permission signal, control for starting charging of battery 210 is carried out (see S22 to S24 in FIG. 6). When the movable body being charged is included in the restriction target selected in S43, in S44, server 500 transmits the charging stop command to that movable body. The movable body that has received the charging stop command quits charging of the power storage (see S25 in FIG. 6).

On the other hand, when the movable body being charged is not included in the restriction target selected in S43, the charging stop command is not transmitted to the movable body being charged (the movable body other than the new movable body). The movable body being charged can continue charging of the power storage with its current state being maintained.

As set forth above, when total feed power in the subject mat exceeds the power capacity of the subject mat if power is fed simultaneously to all of the new movable body and the movable body being charged, server 500 determines whether or not to permit power feed to the new movable body based on the priority of each of the new movable body and the movable body being charged. Then, when server 500 determines to permit power feed to the new movable body, in S44, server 500 transmits the permission signal to the new movable body. As processing in S44 is performed, the series of processing shown in FIG. 8 ends. The permission signal transmitted in S44 corresponds to an exemplary "first permission signal" according to the present disclosure.

As described above, in the power feed system according to the first embodiment, server 500 determines whether or not to permit power feed to the new movable body (S43 in FIG. 8). Then, when server 500 determines not to permit power feed, power is not fed to the new movable body (see S411 and S44 in FIG. 8). In such a power feed system, server 500 can appropriately restrict use of power transmission coils 120 included in power feed mat 100.

The power feed method according to the first embodiment includes processing shown in each of FIGS. 5 to 8. In S411 in FIG. 8, server 500 determines whether or not the movable body that requests power feed mat 100 to feed power falls under the subject movable body adapted to power feed mat 100, power feed mat 100 wirelessly feeding power. When the movable body that requests power feed falls under the subject movable body and power feed mat 100 is feeding power to another movable body (YES in S411 and YES in S412 in FIG. 8), in S413 in FIG. 8, server 500 determines whether or not total feed power in power feed mat 100 exceeds the power capacity of power feed mat 100 if power is fed simultaneously to all of the movable body that requests power feed and another movable body. When total feed power in power feed mat 100 exceeds the power capacity of power feed mat 100 if power is fed simultaneously to all of the movable body that requests power feed and another movable body (YES in S413 in FIG. 8), in S42 to S44 in FIG. 8, server 500 determines whether or not to permit power feed to the movable body that requests power feed based on the priority of each of the movable body that requests power feed and another movable body. According to such a power feed method, use of power transmission coils 120 in power feed mat 100 can appropriately be restricted.

Second Embodiment

The power feed system according to a second embodiment of the present disclosure will be described. Since the second embodiment is common to the first embodiment in many points, a difference will mainly be described and description of features in common is not provided. In the second embodiment, functions of server 500 according to the first embodiment are performed by power feed mat 100. In the second embodiment, the processing shown in FIG. 8 is not performed. Instead of the processing shown in FIGS. 6 and 7, processing shown in FIGS. 9 and 10 which will be described below is performed.

Figure 9:
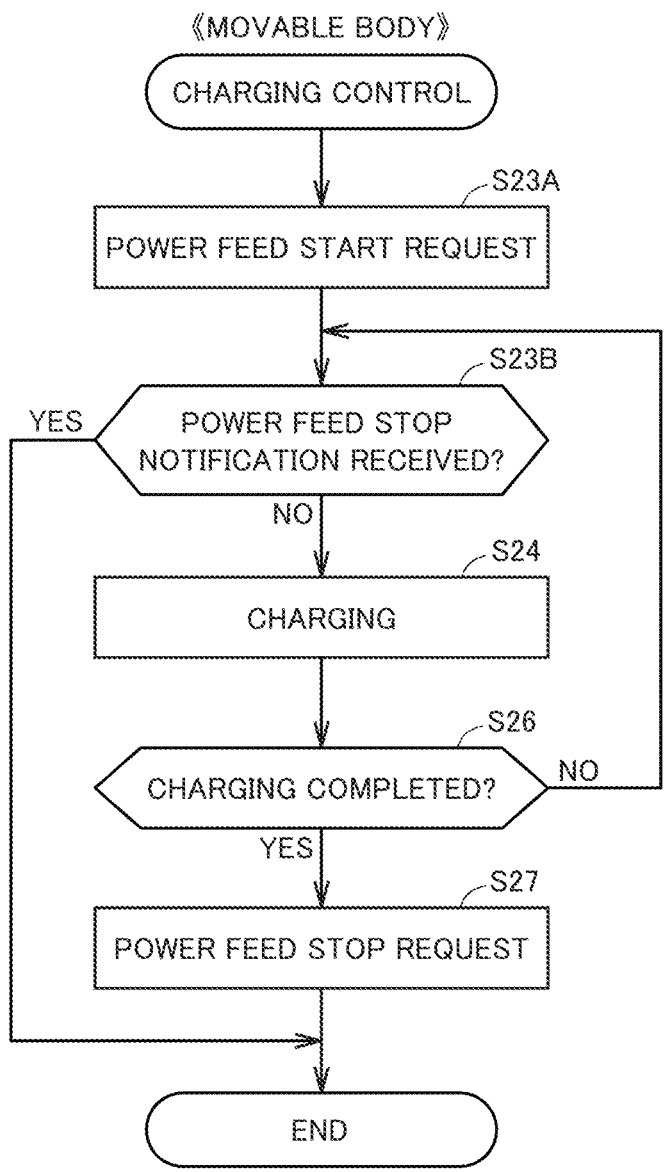
FIG. 9 is a flowchart showing processing involved with charging control performed by the movable body in the power feed system according to a second embodiment of the present disclosure.

FIG. 9 is a flowchart showing processing involved with charging control performed by the movable body (for example, AGV 200) in the power feed system according to the second embodiment. The movable body performs the processing shown in FIG. 5 and performs processing shown in FIG. 9 in S14 in FIG. 5. In the processing shown in FIG. 9, S23A is adopted instead of S23 and S23B is added, as compared with the processing shown in FIG. 6. In the processing shown in FIGS. 9, S21, S22, S25, and S28 (FIG. 6) are not performed. S23A and S23B will mainly be described below.

Referring to FIG. 9 together with FIGS. 3 and 4, in S23A, ECU 250 transmits the power feed start request (a signal requesting start of power feed) to power feed mat 100, together with the movable body ID and the state of AGV 200. In this embodiment, the state of AGV 200 transmitted from AGV 200 to power feed mat 100 includes the SOC of battery 210. Thereafter, in S23B, whether or not AGV 200 has received from power feed mat 100, a power feed stop notification (S44A and S47 in FIGS. 10 and S35 in FIG. 11) which will be described below is determined.

When AGV 200 has not received the power feed stop notification (NO in S23B), in S24, ECU 250 has battery 210 charged while ECU 250 communicates with mat controller 150. Then, when a prescribed charging completion condition is satisfied (YES in S26), in S27, ECU 250 transmits the power feed stop request to power feed mat 100 and thereafter a series of processing shown in FIG. 9 ends.

On the other hand, when AGV 200 has received the power feed stop notification (YES in S23B), the series of processing shown in FIG. 9 ends. Therefore, when AGV 200 receives the power feed stop notification, charging of battery 210 is not carried out.

Figure 10:
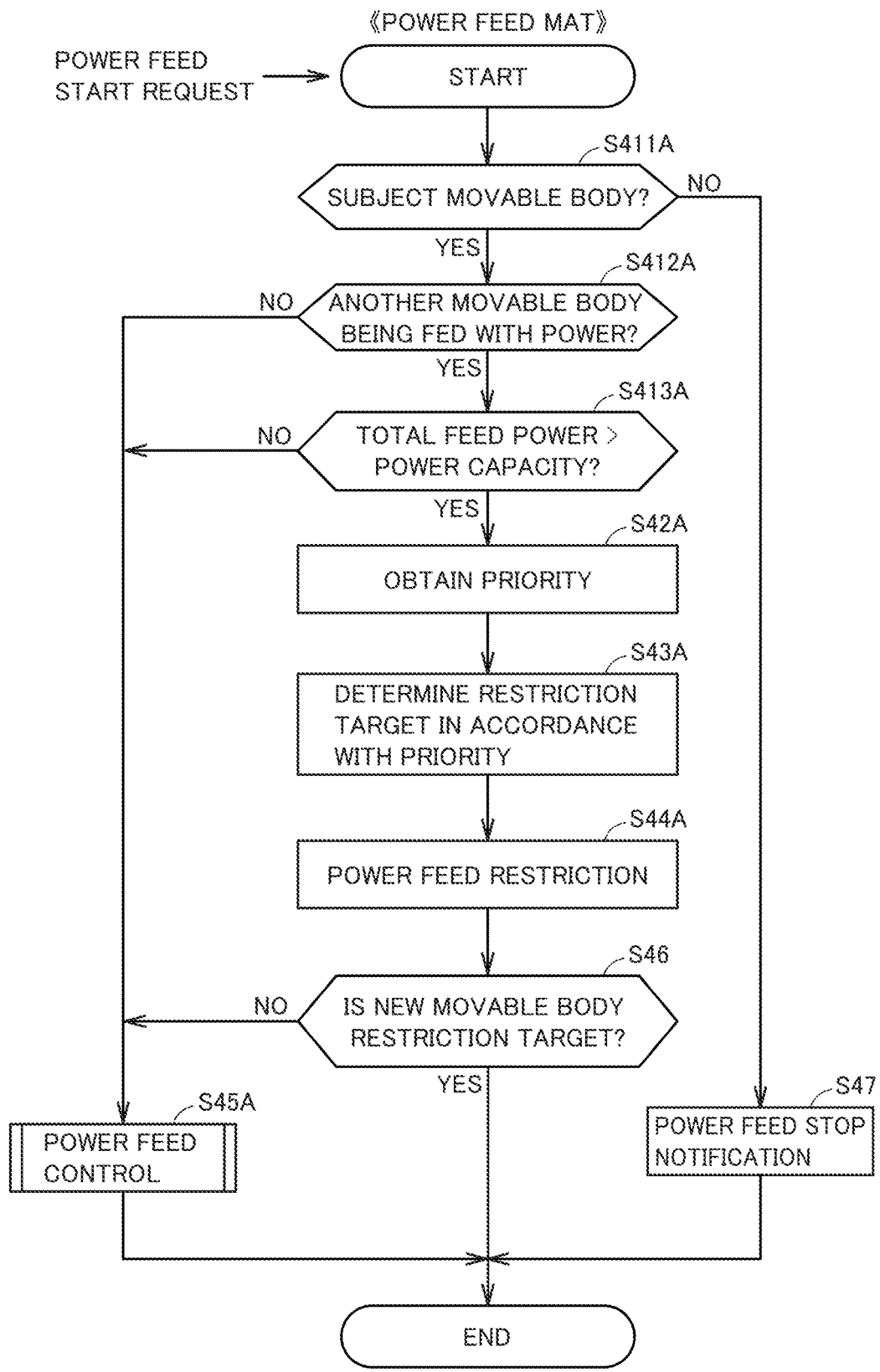
FIG. 10 is a flowchart showing processing involved with power feed control performed by the mat controller in the power feed system according to the second embodiment of the present disclosure.

FIG. 10 is a flowchart showing processing involved with power feed control performed by mat controller 150 in the power feed system according to the second embodiment. Processing shown in this flowchart is performed for a movable body when mat controller 150 receives the power feed start request (S23A in FIG. 9) from that movable body.

Referring to FIG. 10 together with FIGS. 3 and 4, in S411A to S413A, mat controller 150 performs processing similar to S411 to S413 in FIG. 8.

When determination as NO is made in S411A, in S47, mat controller 150 transmits the power feed stop notification to the movable body that requests power feed. In the movable body that has received the power feed stop notification, battery 210 is no longer charged (see FIG. 9).

When determination as NO is made in S412A or S413A, the process proceeds to S45A which will be described later.

When determination as YES is made in all of S411A to S413A, S42A to S44A similar to S42 to S44 in FIG. 8 are performed. In S44A, mat controller 150 transmits the power feed stop notification to the restriction target selected in S43A. In the movable body that has received the power feed stop notification, battery 210 is no longer charged (see FIG. 9).

In following S46, mat controller 150 determines whether or not the restriction target includes the new movable body.

When the restriction target includes the new movable body (YES in S46), a series of processing shown in FIG. 10 ends. Electric power is thus not fed from power feed mat 100 to the new movable body. On the other hand, when the restriction target does not include the new movable body (NO in S46), in S45A, power feed control for the new movable body is carried out.

Figure 11:
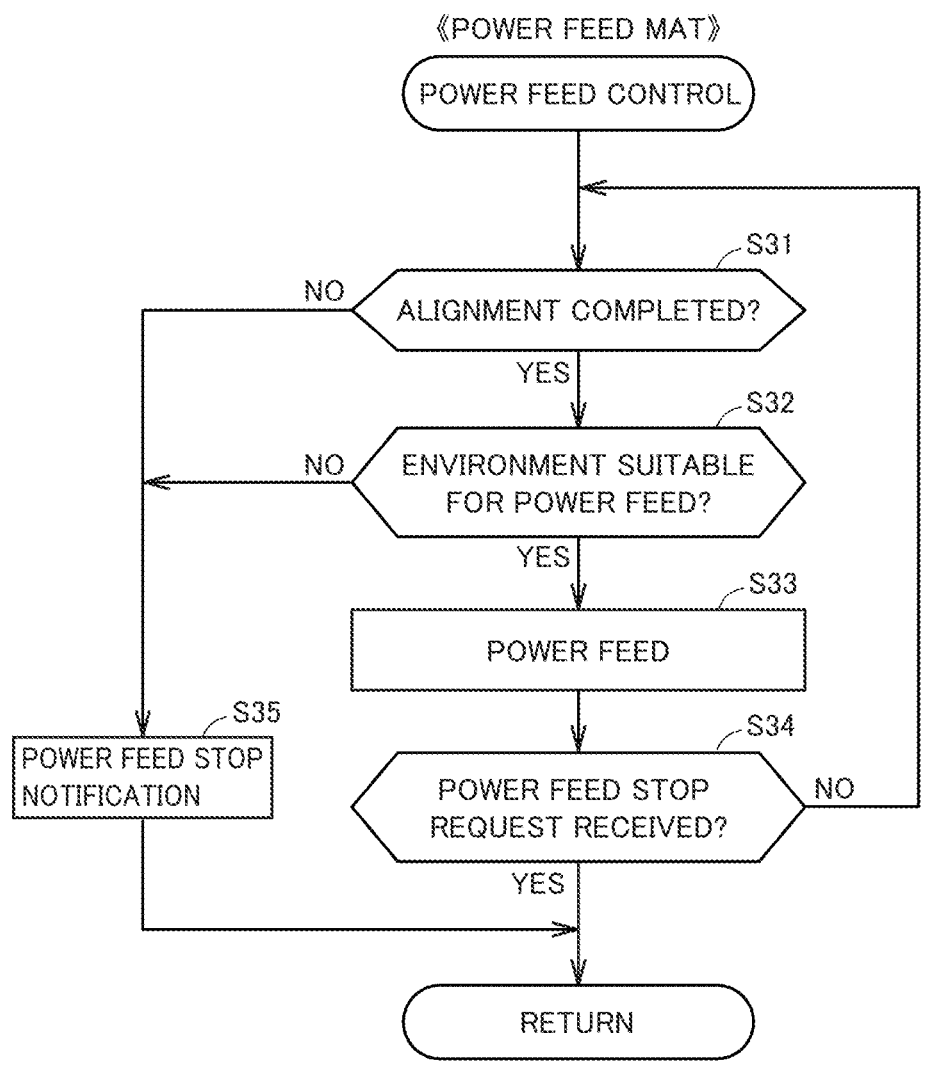
FIG. 11 is a flowchart showing details of processing involved with power feed control shown in FIG. 10.

FIG. 11 is a flowchart showing details of processing in S45A shown in FIG. 10. In processing shown in FIG. 11, S35 is added to the processing shown in FIG. 7. S35 will mainly be described below.

Referring to FIG. 11 together with FIGS. 3 and 4, when determination as YES is made in both of S31 and S32, in S33, electric power is wirelessly fed to the new movable body. Specifically, mat controller 150 designates a subject coil (see S12 and S13 in FIG. 5) to power control circuit 130. Power control circuit 130 thus has electric power selectively supplied to power transmission coil 120 designated by mat controller 150 among the plurality of power transmission coils 120 included in power feed mat 100. Mat controller 150 according to this embodiment corresponds to an exemplary "computer" according to the present disclosure.

On the other hand, when determination as NO is made in any of S31 and S32, the process proceeds to S35. In S35, mat controller 150 transmits the power feed stop notification to the movable body (for example, AGV 200). In the movable body that has received the power feed stop notification, battery 210 is no longer charged (see FIG. 9). When the processing in S35 is performed, a series of processing shown in FIG. 11 ends.

As described above, in the power feed system according to the second embodiment, mat controller 150 determines whether or not to permit power feed to the new movable body (S43A in FIG. 10). When mat controller 150 determines not to permit power feed, power is not fed to the new movable body (see S44A and S47 in FIG. 10). In such a power feed system, mat controller 150 can appropriately restrict use of power transmission coils 120 included in power feed mat 100.

Third Embodiment

The power feed system according to a third embodiment of the present disclosure will be described. Since the third embodiment is common to the first embodiment in many points, a difference will mainly be described and description of features in common is not provided.

In the first embodiment, server 500 transmits a permission signal to the movable body. In contrast, in the third embodiment, server 500 is configured to communicate with mat controller 150 of power feed mat 100 and server 500 transmits the permission signal to power feed mat 100. This permission signal corresponds to an exemplary "second permission signal" according to the present disclosure. Server 500 and mat controller 150 may communicate with each other through wired or wireless communication. Server 500 and mat controller 150 according to the third embodiment correspond to an exemplary "computer" and an exemplary "second controller" according to the present disclosure, respectively.

In the third embodiment, the processing shown in FIG. 9 is performed instead of the processing shown in FIG. 6 and processing shown in FIGS. 12 and 13 which will be described below is performed instead of the processing shown in FIGS. 7 and 8. The movable body performs the processing shown in FIG. 5 and performs the processing shown in FIG. 9 in S14 in FIG. 5.

Figure 12:
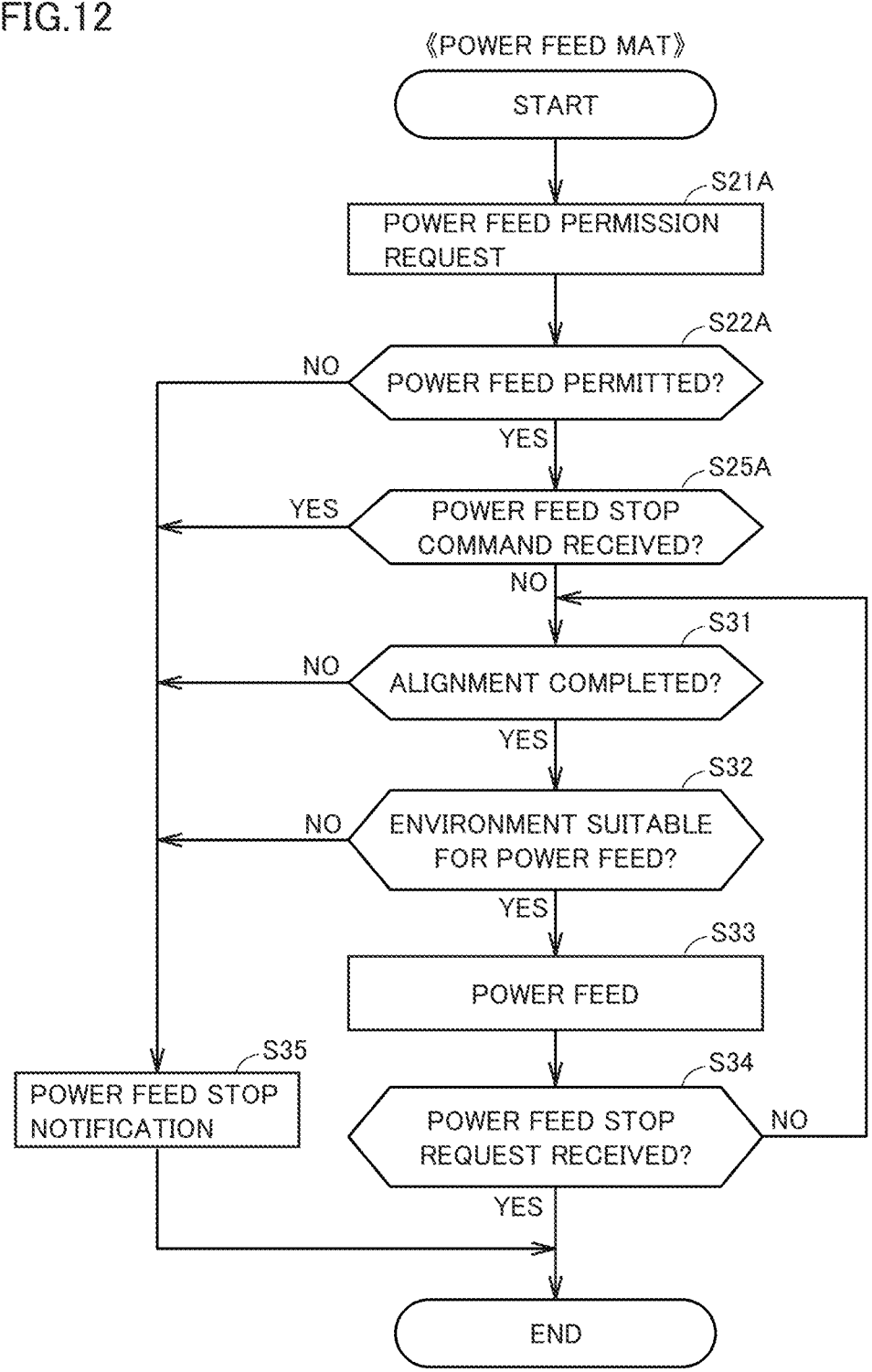
FIG. 12 is a flowchart showing processing involved with power feed control performed by the mat controller in the power feed system according to a third embodiment of the present disclosure.

FIG. 12 is a flowchart showing processing involved with power feed control performed by mat controller 150 in the power feed system according to the third embodiment. Processing shown in this flowchart is performed for a movable body when mat controller 150 receives the power feed start request (S23A in FIG. 9) from that movable body.

Referring to FIG. 12 together with FIGS. 3 and 4, in S21A, mat controller 150 transmits the power feed permission request (a signal requesting power feed permission) to server 500 together with the mat ID of power feed mat 100 as well as the movable body ID and the state (including the SOC of battery 210) of AGV 200.

In following S22A, mat controller 150 determines whether or not power feed mat 100 has received power feed permission from server 500 within a prescribed time period since the processing in S21A was performed. When power feed mat 100 has received the permission signal (S44B or S45B in FIG. 13) from server 500 within the prescribed time period since the processing in S21A was performed, determination as YES is made in S22A and the process proceeds to S25A. In S25A, mat controller 150 determines whether or not power feed mat 100 has received from server 500, the power feed stop command associated with the movable body that requests power feed. When power feed mat 100 has not received the power feed stop command (NO in S25A), the process proceeds to S31. Processing in S31 or later is the same as the processing shown in FIG. 11.

When determination as NO is made in any of S22A, S31, and S32 or when determination as YES is made in S25A, the process proceeds to S35. In S35, mat controller 150 transmits the power feed stop notification to the movable body (for example, AGV 200). In the movable body that has received the power feed stop notification, battery 210 is no longer charged (see FIG. 9). As processing in S35 is performed, a series of processing shown in FIG. 12 ends.

Figure 13:
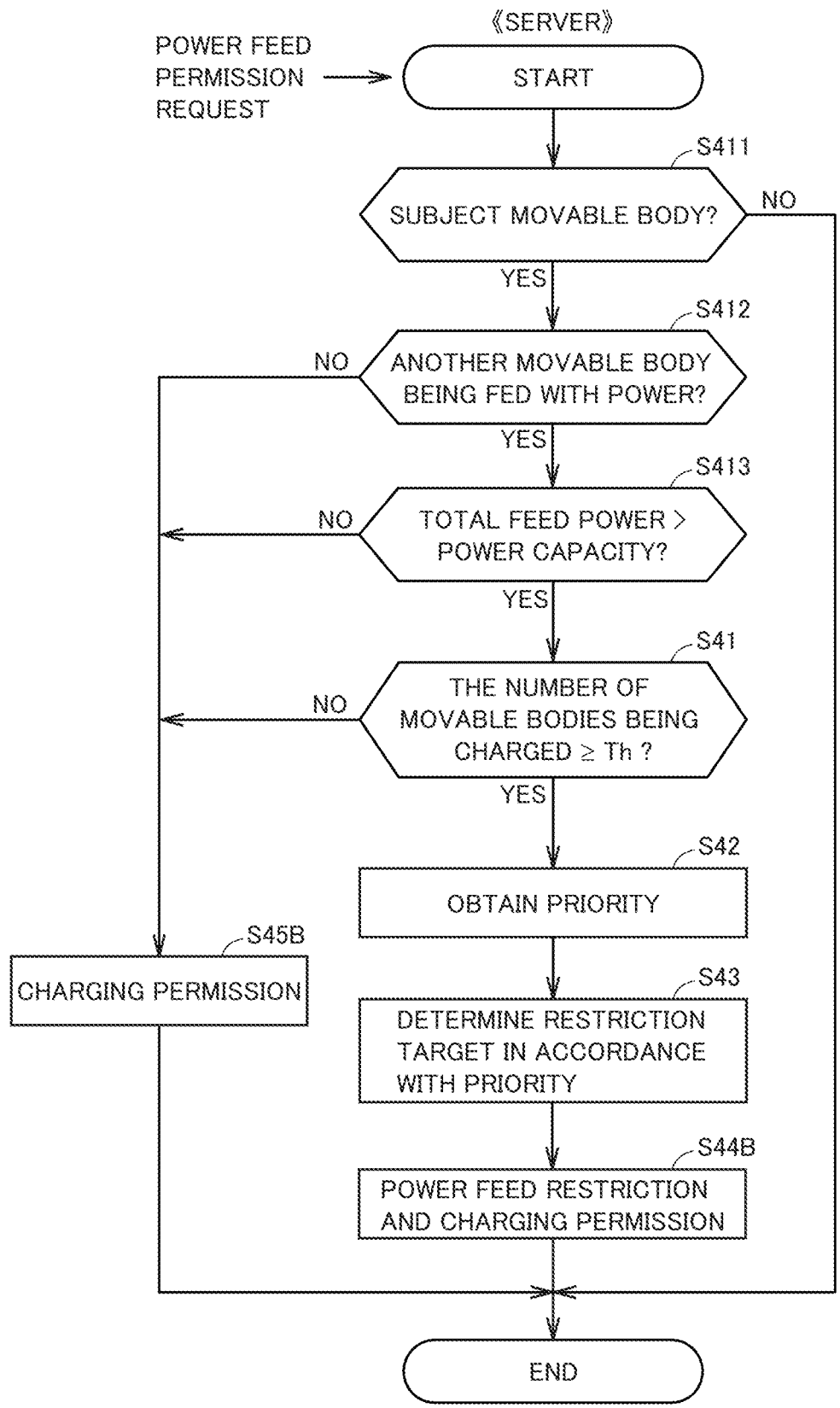
FIG. 13 is a flowchart showing processing involved with power feed permission performed by the server in the power feed system according to the third embodiment of the present disclosure.

FIG. 13 is a flowchart showing processing involved with power feed permission performed by server 500 in the power feed system according to the third embodiment. Processing shown in this flowchart is performed for power feed mat 100 that requests power feed permission when server 500 receives the power feed permission request (S21A in FIG. 12) from power feed mat 100. In the processing shown in FIG. 13, S44B and S45B are adopted instead of S44 and S45 (FIG. 8). S44B and S45B will mainly be described below.

Referring to FIG. 13 together with FIGS. 3 and 4, when determination as NO is made in S41, the process proceeds to S45B. In S45B, server 500 transmits the permission signal to power feed mat 100. The permission signal is a signal indicating power feed permission to power feed mat 100. In power feed mat 100 that has received the permission signal, control for starting power feed by the subject coil (that is, power transmission coil 120 alignment of which with a movable body that requests power feed has been completed) is carried out (see FIG. 12). As processing in S45B is performed, a series of processing shown in FIG. 13 ends.

On the other hand, when determination as YES is made in S41, the process proceeds to S44B via S42 and S43. In S44B, server 500 restricts power feed to the restriction target selected in S43.

When the new movable body is included in the restriction target, in S44B, server 500 does not permit power feed mat 100 to feed power. In other words, server 500 does not transmit the permission signal in response to the power feed permission request from power feed mat 100. In power feed mat 100 that does not receive the permission signal, control for starting power feed by power transmission coil 120 aligned with power reception coil 220 of the new movable body is not carried out (see FIG. 12).

On the other hand, when the new movable body is not included in the restriction target, in S44B, server 500 transmits the permission signal to power feed mat 100, together with the movable body ID of the new movable body. In power feed mat 100 that has received the permission signal, control for starting power feed by power transmission coil 120 aligned with power reception coil 220 of the new movable body is carried out (see FIG. 12).

When the movable body being charged is included in the restriction target, in S44B, server 500 transmits the power feed stop command to power feed mat 100 together with the movable body ID of that movable body. Power feed mat 100 that has received the power feed stop command quits power feed by power transmission coil 120 aligned with power reception coil 220 of the movable body being charged indicated by the movable body ID (see FIG. 12).

As described above, in the power feed system according to the third embodiment, server 500 is configured to determine whether or not to permit power feed to the new movable body that requests power feed based on the priority of each of the plurality of movable bodies on power feed mat 100 and to transmit the permission signal (second permission signal) to power feed mat 100 when it determines to permit power feed (S44B and S45B in FIG. 13). Server 500 is configured to carry out, when alignment between the new movable body and any power transmission coil 120 included in power feed mat 100 is completed and power feed mat 100 receives the permission signal (second permission signal), control for starting power feed by the power transmission coil alignment of which is completed (see S22A and S31 to S33 in FIG. 12). According to such a configuration, server 500 can restrict power feed to the new movable body by not transmitting the second permission signal to power feed mat 100.

Other Embodiments

In each embodiment, the priority of each movable body on power feed mat 100 is determined such that the movable body smaller in remaining amount of stored power is higher in priority (for example, S42 in FIG. 8). How to determine the priority, however, is not limited to the method above.

For example, when movable bodies 201 to 205 (each of which is an AGV) are present on power feed mat 100, server 500 may determine the priority of each movable body on power feed mat 100 such that an AGV that is carrying a load is higher in priority than an AGV that is not carrying a load. The AGV corresponds to a movable body for delivery. The AGV that is carrying a load corresponds to a movable body with a task (specifically, a delivery task).

When each movable body on power feed mat 100 has a task, server 500 may evaluate the task for each movable body and determine the priority of each movable body on power feed mat 100 based on a result of evaluation. A modification in which such a method of determining the priority is adopted will be described below.

FIG. 14 is a diagram showing a method of determining the priority according to the modification. In this modification, when a task is set for the movable body, the charging start condition (that is, the condition under which the processing shown in FIG. 5 is performed) described previously is satisfied. Therefore, in the modification of the first embodiment, the new movable body found in the processing shown in FIG. 8 and the movable body being charged each have a task. Each movable body (the new movable body and the movable body being charged) on the subject mat has, for example, a task shown in FIG. 14. In FIG. 14, movable bodies #1 to #4 correspond to movable bodies on the subject mat.

Referring to FIG. 14, in this modification, a priority index is calculated in accordance with an expression "priority index=coefficient a×Pa+coefficient b×(1/Pb)+coefficient c×Pc+coefficient d×Pd." Any coefficients a to d can be set. In this modification, coefficient a, coefficient b, coefficient c, and coefficient d are set to 1, 100, 10, and 0.1, respectively.

Pa represents an amount of power feed requested for the task. Pa is calculated by subtracting the current remaining amount of stored power from a target amount of stored power for the task. Server 500 can obtain Pa by subtracting a current SOC from a target SOC in charging control. For example, in movable body #1 shown in FIG. 14, the current SOC is 60(%) and the target SOC is 70(%). Therefore, "coefficient a×Pa" for movable body #1 is calculated as 10 (=1×(70−60)).

Pb represents allowance time from the current time until start of the task. As time to start the task that is requested is earlier, Pb is smaller. For example, in movable body #1 shown in FIG. 14, the time to start the task that is requested comes within twenty minutes and hence Pb is set to 20 (minutes). Therefore, "coefficient b (1/Pb)" for movable body #1 is calculated as 5 (=100×(1/20)).

Pc represents a point determined based on a type of the task. Pc is determined in advance for each type of the task. In this modification, the task is categorized into a standard mail, an express mail, a cool service, and an urgent task. The cool service refers to a service for transporting a load in a chilled or frozen condition. The express mail refers to a service for delivering a load earlier than the standard mail. In electronic commerce, a service of the express mail may be provided to a specific limited contractor. The urgent task refers to a task of great urgency. For example, a task for medical care or disaster control falls under the urgent task. In this modification, points for the standard mail, the express mail, and the cool service are determined as one, five, and ten, respectively. In addition, the point for the urgent task is set to a highest value (infinity) such that the highest priority is given to the urgent task. For example, for movable body #1 shown in FIG. 14, the type of the task is the standard mail. Therefore, "coefficient c×Pc" for movable body #1" is calculated as 10 (=10×1).

Pd represents a profit obtained from the task. The profit obtained from the task may be a profit determined based on the type of the task (for example, a profit determined in a contract). In this modification, the profit obtained from the task is calculated in consideration also of a time period required for the task. Server 500 converts a predicted profit obtained by completing the task into a unit price per one hour. The unit price per unit time of the thus obtained predicted profit is adopted as the profit obtained from the task. For example, for movable body #1 shown in FIG. 14, the profit obtained from the task (the unit price per unit time of the predicted profit) is 500 (yen). Therefore, "coefficient d×Pd" for movable body #1 is calculated as 50 (=0.1×500).

In this modification, in S42 in FIG. 8, server 500 evaluates the task for each movable body, and determines the priority of each movable body on power feed mat 100 based on a result of evaluation. Specifically, server 500 obtains from each movable body on the subject mat, the current SOC (the remaining amount of stored power) of the power storage and information on the task (the type, start time, the target amount of stored power, and the predicted profit), and calculates the priority index of each movable body on the subject mat in accordance with the expression described previously. For example, the priority index of movable body #1 is calculated as 75 (=10+5+10+50). In addition, the priority indices of movable bodies #2, #3, and #4 are calculated as 340, 181, and the highest value (infinity), respectively. The priority index corresponds to the result of evaluation of the task. Server 500 determines the priority of each movable body on power feed mat 100 such that a movable body larger in priority index is higher in priority. The priority of movable bodies #1 to #4 is higher in the order of #4, #2, #3, and #1.

When a plurality of movable bodies are equal in calculated priority index, the priority cannot be determined based on the priority index. Therefore, the priority of those movable bodies may be determined from another point of view. For example, the priority of each movable body may be determined such that a movable body smaller in remaining amount of stored power is higher in priority.

In the power feed system according to the modification, it is expected that only the movable bodies with the task are present on the subject mat at the time of start of the processing shown in FIG. 8. Without being limited as such, the charging start condition may be modified such that the movable body with the task and the movable body without the task are both present on the subject mat. For example, when the remaining amount of stored power of a movable body becomes equal to or smaller than a prescribed value regardless of presence of the task, the charging start condition may be satisfied for that movable body. In such a form, in S42 in FIG. 8, the priority of each movable body on the subject mat may be determined such that the movable body with the task is higher in priority than the movable body without the task.

Figure 15:
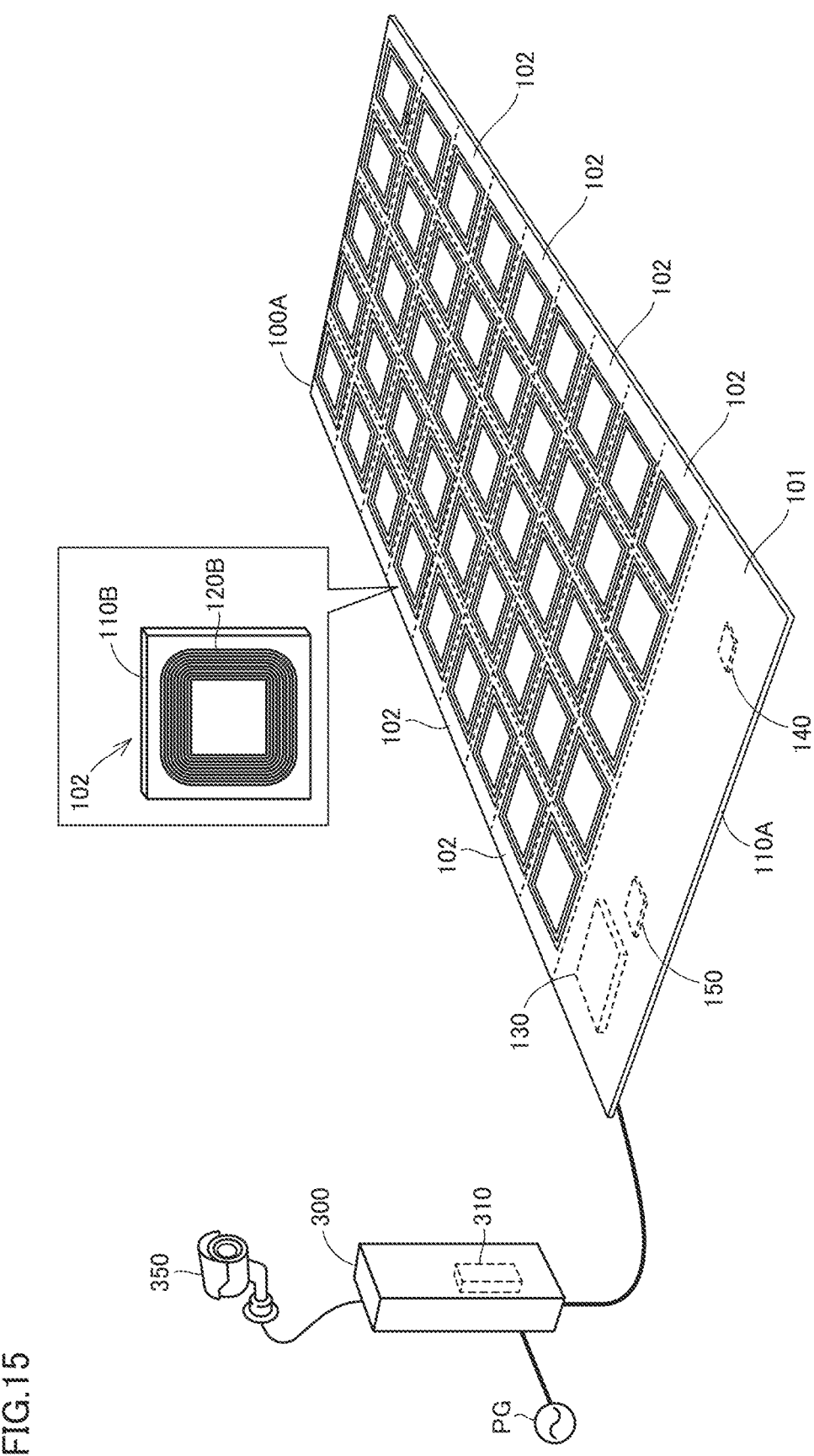
FIG. 15 is a diagram showing a modification of the power feed mat shown in FIG. 1.

In each embodiment above, the power feed mat is flexible to such an extent that it can be rolled into a cylinder (see FIG. 1). The power feed mat, however, does not have to be bendable. FIG. 15 is a diagram showing a modification of power feed mat 100 shown in FIG. 1.

Referring to FIG. 15, a power feed mat 100A is formed like a sheet by combination of one first plate member 101 with a plurality of second plate members 102.

First plate member 101 is electrically connected to power supply module 300 through a cable. First plate member 101 may always be connected to power supply module 300 or may be attachable thereto and removable therefrom. First plate member 101 includes a sheet substrate 110A, power control circuit 130, wireless communication instrument 140, and mat controller 150. Power control circuit 130, wireless communication instrument 140, and mat controller 150 are contained in sheet substrate 110A. First plate member 101 has a rectangular outer geometry (two-dimensional shape). Without being limited as such, the outer geometry of first plate member 101 can be modified as appropriate.

Each of the plurality of second plate members 102 includes a sheet substrate 110B and a power transmission coil 120B. Power transmission coil 120B is provided on a surface of sheet substrate 110B. Without being limited as such, power transmission coil 120B may be contained in sheet substrate 110B. Electric power supplied from power grid PG is supplied to each second plate member 102 through power supply module 300 and first plate member 101. Power supply circuit 310 included in power supply module 300 supplies electric power to power transmission coil 120B included in each second plate member 102.

Second plate member 102 includes a single power transmission coil 120B. Without being limited as such, second plate member 102 may include at least two power transmission coils 120B. Second plate member 102 has a square outer geometry (two-dimensional shape). Without being limited as such, the outer geometry of second plate member 102 is not limited to the square shape but may be a rectangular shape, a polygonal shape (a triangular shape, a pentagonal shape, a hexagonal shape, or the like) other than a quadrangular shape, a circular shape, or a band shape.

Second plate member 102 may include a connector for connection to an electrical wire (an electrical wire leading to power transmission coil 120B) of adjacent second plate member 102. Second plate member 102 may further include a locking mechanism that fixes a connected connector. Second plate member 102 may include a retainer that reinforces physical connection to adjacent second plate member 102. Second plate member 102 may include a portion of coupling (for example, a fitting portion that can be fitted, an engagement portion that can be engaged, or a fastening portion that can be fastened) to adjacent second plate member 102. Adjacent second plate members 102 may be coupled by fitting. Adjacent second plate members 102 may be fastened. Adjacent second plate members 102 may be positioned by using a positioning pin.

By combining a plurality of second plate members 102 with single first plate member 101, power feed mat 100A that performs a function similarly to power feed mat 100 shown in FIG. 1 is formed. A method of coupling between first plate member 101 and second plate member 102 may be the same as or different from a method of coupling between adjacent second plate members 102. A plurality of second plate members 102 may be coupled in grids.

Power feed mat 100A is constructed as being disassemblable. A plurality of second plate members 102 that form power feed mat 100A by being combined can return to individual small pieces (second plate members 102). Power feed mat 100A is constructed as being disassemblable into single first plate member 101 and a plurality of second plate members 102. Therefore, power feed mat 100A is easily carried. When at least one of the plurality of second plate members 102 that form power feed mat 100A fails or deteriorates, that second plate member 102 alone can be replaced.

The power feed mat may be provided outdoors. A movable body to which the power feed mat is applied is not limited to the vehicle shown in FIGS. 2 and 3. The movable body is not limited to the BEV without including an internal combustion engine but may be a plug-in hybrid electric vehicle (PHEV) including an internal combustion engine. The movable body may be an agricultural machine, a walking robot, a drone, a robot cleaner, or a spacecraft, or a rail vehicle, a ship, or an airplane.

Various modifications may be carried out as freely being combined.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:
1. A power feed system, comprising:
a power feed mat; and
a computer, wherein
the power feed mat includes a plurality of power transmission coils, the power feed mat is configured to feed power to at least one movable body on the power feed mat by using at least one of the plurality of power transmission coils,
the computer is configured to determine whether to permit power feed to a movable body that requests power feed,
when the computer determines not to permit power feed, the power feed mat does not feed power to the movable body that requests power feed, and
the computer
  determines whether the movable body that requests power feed falls under a subject movable body adapted to the power feed mat,
  determines, when the movable body that requests power feed does not fall under the subject movable body, not to permit power feed to the movable body that requests power feed,
  determines, when the movable body that requests power feed falls under the subject movable body and the power feed mat is not feeding power, to permit power feed to the movable body that requests power feed,
  determines, when the movable body that requests power feed falls under the subject movable body and the power feed mat is feeding power to another movable body, whether total feed power in the power feed mat exceeds a power capacity of the power feed mat if power is fed simultaneously to all of the movable body that requests power feed and the another movable body,
  determines, when the total feed power does not exceed the power capacity even if power is fed simultaneously to all of the movable body that requests power feed and the another movable body, to permit power feed to the movable body that requests power feed, and
  determines, when the total feed power exceeds the power capacity if power is fed simultaneously to all of the movable body that requests power feed and the another movable body, whether to permit power feed to the movable body that requests power feed based on a priority of each of the movable body that requests power feed and the another movable body.

2. The power feed system according to claim 1, wherein the computer determines the priority such that a movable body smaller in remaining amount of stored power is higher in priority.

3. The power feed system according to claim 1, wherein when each of the movable body that requests power feed and the another movable body is a movable body for delivery, the computer determines the priority such that a movable body carrying a load is higher in priority than a movable body not carrying a load.

4. The power feed system according to claim 1, wherein when each of the movable body that requests power feed and the another movable body has a task, the computer evaluates the task for each movable body and determines the priority based on a result of evaluating the task.

5. The power feed system according to claim 1, wherein the power feed mat is flexible to such an extent that the power feed mat can be rolled into a cylinder.

6. The power feed system according to claim 1, wherein the power feed mat is formed by combination of a plurality of plate members,
the power feed mat is constructed as being disassemblable into the plurality of plate members, and
each of the plurality of plate members includes at least one power transmission coil among the plurality of power transmission coils.

7. The power feed system according to claim 1, wherein the power feed mat is constructed to be placed on a floor indoors.

8. A power feed system, comprising:
a power feed mat; and
a computer, wherein
the power feed mat includes a plurality of power transmission coils,
the power feed mat is configured to feed power to at least one movable body on the power feed mat by using at least one of the plurality of power transmission coils,
the computer is configured to determine whether to permit power feed to a movable body that requests power feed,
when the computer determines not to permit power feed, the power feed mat does not feed power to the movable body that requests power feed,
the computer is configured to communicate with each of a plurality of movable bodies,
each of the plurality of movable bodies includes
  a power storage,
  a power reception coil that receives electric power from a power transmission coil included in the power feed mat,
  a charging circuit that charges the power storage with electric power received by the power reception coil, and
  a first controller that controls the charging circuit,
the computer is configured to transmit a first permission signal to the movable body that requests power feed when the computer determines to permit power feed to the movable body that requests power feed, and
the first controller is configured to carry out control for starting charging of the power storage when alignment between the power reception coil of the movable body that requests power feed and any power transmission coil included in the power feed mat is completed and the movable body receives the first permission signal.

9. The power feed system according to claim 8, wherein each of the plurality of movable bodies is an autonomous vehicle configured to travel with electric power stored in the power storage, without human intervention, and
each of the plurality of movable bodies is configured such that, when a corresponding movable body of the plurality of movable bodies arrives at the power feed mat, the corresponding movable body selects one power transmission coil from among the plurality of power transmission coils and aligns the selected power transmission coil and the power reception coil with each other.

10. The power feed system according to claim 8, wherein the power feed mat is flexible to such an extent that the power feed mat can be rolled into a cylinder.

11. The power feed system according to claim 8, wherein the power feed mat is formed by combination of a plurality of plate members,
the power feed mat is constructed as being disassemblable into the plurality of plate members, and
each of the plurality of plate members includes at least one power transmission coil among the plurality of power transmission coils.

12. The power feed system according to claim 8, wherein the power feed mat is constructed to be placed on a floor indoors.

13. A power feed system, comprising:
a power feed mat; and
a computer, wherein
the power feed mat includes a plurality of power transmission coils,
the power feed mat is configured to feed power to at least one movable body on the power feed mat by using at least one of the plurality of power transmission coils,
the computer is configured to determine whether to permit power feed to a movable body that requests power feed,
when the computer determines not to permit power feed, the power feed mat does not feed power to the movable body that requests power feed,
the power feed system further comprises:
   a power supply circuit that supplies electric power to each of the plurality of power transmission coils, and
   a power control circuit that receives supply of electric power from the power supply circuit and switches between connection and disconnection between each of the plurality of power transmission coils and the power supply circuit,
the power feed mat includes a second controller that controls the power control circuit,
the computer is configured to communicate with the second controller,
the computer is configured to transmit a second permission signal to the power feed mat when the computer determines to permit power feed to the movable body that requests power feed, and
the second controller is configured to carry out, when alignment between the movable body that requests power feed and any power transmission coil included in the power feed mat is completed and the power feed mat receives the second permission signal, control for starting power feed by a power transmission coil the alignment of which is completed.

14. The power feed system according to claim 13, wherein the power feed mat is flexible to such an extent that the power feed mat can be rolled into a cylinder.

15. The power feed system according to claim 13, wherein the power feed mat is formed by combination of a plurality of plate members,
the power feed mat is constructed as being disassemblable into the plurality of plate members, and
each of the plurality of plate members includes at least one power transmission coil among the plurality of power transmission coils.

16. The power feed system according to claim 13, wherein the power feed mat is constructed to be placed on a floor indoors.

\* \* \* \* \*